(12) United States Patent
Bagchi et al.

(10) Patent No.: US 11,018,529 B2
(45) Date of Patent: May 25, 2021

(54) WIRELESS CHARGER FOR UNDERWATER VEHICLES FED FROM A CONSTANT CURRENT DISTRIBUTION CABLE

(71) Applicant: Utah State University, Logan, UT (US)

(72) Inventors: Anindya Chitta Bagchi, Logan, UT (US); Tarak Saha, Logan, UT (US); Abhilash Kamineni, North Logan, UT (US); Regan A. Zane, Hyde Park, UT (US)

(73) Assignee: Utah State University

( * ) Notice: Subject to any disclaimer, the term of this patent is extended or adjusted under 35 U.S.C. 154(b) by 56 days.

(21) Appl. No.: 16/452,281

(22) Filed: Jun. 25, 2019

(65) Prior Publication Data

US 2020/0373785 A1     Nov. 26, 2020

Related U.S. Application Data

(63) Continuation-in-part of application No. 16/417,221, filed on May 20, 2019.

(51) Int. Cl.
*H02J 50/12*         (2016.01)
*H02J 7/02*          (2016.01)
(Continued)

(52) U.S. Cl.
CPC .............. *H02J 50/12* (2016.02); *B60L 53/12* (2019.02); *B60L 53/60* (2019.02); *B63G 8/00* (2013.01);
(Continued)

(58) Field of Classification Search
CPC ..... H02M 3/33584; H02M 2001/0067; H02M 3/33592; G05F 1/10; H02J 50/12;
(Continued)

(56) References Cited

U.S. PATENT DOCUMENTS

2002/0126517 A1    9/2002  Matsukawa et al.
2006/0152947 A1*   7/2006  Baker ............... H02M 3/33507
                                                  363/16
(Continued)

OTHER PUBLICATIONS

U.S. Appl. No. 16/417,221, Office Action, dated Apr. 1, 2020, pp. 1-21.
(Continued)

*Primary Examiner* — Adolf D Berhane
*Assistant Examiner* — Kevin H Sprenger

(57) ABSTRACT

An apparatus for inductive power transfer ("IPT") includes an active bridge section with input terminals that receive power from a constant current source, where the active bridge section operates at a fixed switching frequency, a primary resonant capacitor connected in series with an output terminal of the active bridge section, and a primary IPT coil connected in series with the primary resonant capacitor, where power is transferred wirelessly between the primary IPT coil and a secondary IPT coil, and the secondary IPT coil is connected in series with a secondary resonant capacitor, which is connected in series with an output rectifier section that receives power from the secondary IPT coil and comprising output terminals for connection to a load. The apparatus includes a controller that regulates output voltage to the load, where the controller regulates output voltage to the load by controlling switching of the active bridge section.

19 Claims, 21 Drawing Sheets

(51) Int. Cl.
 *H02M 3/335* (2006.01)
 *B60L 53/60* (2019.01)
 *B63G 8/00* (2006.01)
 *B60L 53/12* (2019.01)

(52) U.S. Cl.
 CPC ......... *H02J 7/025* (2013.01); *H02M 3/33592* (2013.01); *B60L 2200/32* (2013.01)

(58) Field of Classification Search
 CPC .......... H02J 7/025; B60L 53/60; B60L 53/12; B60L 2200/32; B63G 8/00
 See application file for complete search history.

(56) References Cited

U.S. PATENT DOCUMENTS

| | | | |
|---|---|---|---|
| 2008/0101096 | A1 | 5/2008 | Takayanagi et al. |
| 2012/0250369 | A1 | 10/2012 | Furukawa |
| 2013/0033118 | A1* | 2/2013 | Karalis ................ H02J 50/50 307/104 |
| 2013/0223103 | A1 | 8/2013 | Pahlevaninezhad et al. |
| 2013/0322128 | A1 | 12/2013 | Takegami |
| 2013/0343089 | A1* | 12/2013 | Gupta ................... H02M 7/49 363/16 |
| 2014/0334189 | A1 | 11/2014 | Yan et al. |
| 2014/0346962 | A1 | 11/2014 | Sanders et al. |
| 2015/0256084 | A1 | 9/2015 | Liu et al. |
| 2015/0333634 | A1 | 11/2015 | Yoshida et al. |
| 2016/0233776 | A1 | 8/2016 | Nielsen |
| 2016/0276941 | A1 | 9/2016 | Iwaya et al. |
| 2017/0237354 | A1 | 8/2017 | Takahara et al. |
| 2018/0294674 | A1* | 10/2018 | Choi ...................... B60L 53/12 |
| 2018/0366986 | A1* | 12/2018 | Kim ...................... H02J 50/12 |
| 2019/0081565 | A1 | 3/2019 | Jans et al. |
| 2019/0089254 | A1 | 3/2019 | Op Het et al. |
| 2019/0190393 | A1 | 6/2019 | Murakami |
| 2019/0348833 | A1 | 11/2019 | Sun et al. |

OTHER PUBLICATIONS

Borage et al., "Resonant Immittance Converter Topologies", IEEE Transactions on Industrial Electronics, vol. 58, No. 3, pp. 971-978, Mar. 2011.

Borage et al., "Analysis and Design of an LCL-T Resonant Converter as a Constant-Current Power Supply", IEEE Transactions on Industrial Electronics, vol. 52, No. 6, pp. 1547-1554, Dec. 2005.

Khatua et al., "High-Performance Megahertz-Frequency Resonant DC-DC Converter for Automotive LED Driver Applications," 2018 IEEE Energy Conversion Congress and Exposition (ECCE), Portland, OR, 2018, pp. 2186-2192.

Zapolskiy et al., "Single-Cycle LCL-T Resonant Converter for Solar Battery," Oct. 2018 XIV International Scientific Technical Conference on Actual Problems of Electronics Instrument Engineering (APEIE), Novosibirsk, 2018, pp. 90-93.

Saha et al., "Analysis and Design of a Parallel Resonant Converter for Constant Current Input to Constant Voltage Output DC-DC Converter Over Wide Load Range," 2018 International Power Electronics Conference (IPEC-Niigata 2018—ECCE Asia), Niigata, May 20, 2018, pp. 4074-4079.

Saha et al., "Analysis and Design of Wide Range Output Voltage Regulated Power Supply for Underwater Constant Input Current DC Distribution System," 2018 IEEE 19th Workshop on Control and Modeling for Power Electronics (COMPEL), Padua, Jun. 2018, pp. 1-7.

\* cited by examiner (a)

(b)

(a)

(b)

(a) $Q_{p,load}$ and $Q_{s,load}$ vs $P_{out}$ (b) $THD_{i,pri}$ and $THD_{i,sec}$ vs $P_{out}$ (a) $V_{out}$ vs $P_{out}$ for $\varphi_{AB} = 120°$ (b) $\varphi_{AB}$ vs $P_{out}$ for $V_{out} = 16$ V (a) At $P_{out}$ = 34 W with $R_{load}$ = 7.5 Ω

(b) At $P_{out}$ = 330 W with $R_{load}$ = 0.8 Ω

(a) $Q_{p,load}$ and $Q_{s,load}$ vs $P_{out}$ for $V_{out} = 16$ V (b) $THD_{i,pri}$ and $THD_{i,sec}$ vs $P_{out}$ for $V_{out} = 16$ V

WIRELESS CHARGER FOR UNDERWATER VEHICLES FED FROM A CONSTANT CURRENT DISTRIBUTION CABLE

CROSS-REFERENCES TO RELATED APPLICATIONS

This is a continuation-in-part application of and claims priority to U.S. patent application Ser. No. 16/417,221 entitled "CONSTANT DC CURRENT INPUT TO CONSTANT DC VOLTAGE OUTPUT POWER SUPPLY COVERING A WIDE PROGRAMMABLE RANGE" and filed on May 20, 2019 for Tarak Saha, et al., which is incorporated herein by reference.

FIELD

This invention relates to wireless power transfer ("WPT") and more particularly relates to a DC-DC power supply fed by a constant current source and regulating output voltage and used for wireless power transfer.

BACKGROUND

Resonant power conversion topologies have widely been used in various applications such as DC distribution systems, bi-directional DC-DC converters, and wireless power transfer systems due to their benefits of soft-switching ability, low electromagnetic interference ("EMI"), high power density etc. Resonant converters are widely applied in various applications such as Uninterrupted Power Systems ("UPSs"), DC distribution systems and inductive power transfer ("IPT") systems for high efficiency and low electromagnetic interference ("EMI"). In a variety of industrial applications, including LED drivers, battery charging and capacitor charging, output current regulated power supplies are often used. In some applications, such as an underwater telecommunication and undersea observation system, a constant DC current distribution from the shore is preferred over DC voltage distribution for its robustness against cable impedance and faults.

The input voltage range and voltage ratings within the current-fed converter may be high, which increases cost of the converter. A range of the output voltage is also impacted by possible voltage ratings of components of the converter.

SUMMARY

An apparatus for IPT includes an active bridge section with input terminals that receive power from a constant current source, where the active bridge section operates at a fixed switching frequency, a primary resonant capacitor connected in series with an output terminal of the active bridge section, and a primary IPT coil connected in series with the primary resonant capacitor, where power is transferred wirelessly between the primary IPT coil and a secondary IPT coil, and the secondary IPT coil is connected in series with a secondary resonant capacitor, which is connected in series with an output rectifier section that receives power from the secondary IPT coil and comprising output terminals for connection to a load. The apparatus includes a controller that regulates output voltage to the load, where the controller regulates output voltage to the load by controlling switching of the active bridge section.

Another apparatus for IPT includes a secondary IPT coil on a mobile device where the secondary IPT coil receives power wirelessly from a primary IPT coil of a primary inverter in a fixed location, a secondary resonant capacitor connected in series with the secondary IPT coil where the secondary resonant capacitor is on the mobile device, and an output rectifier section connected in series with the secondary resonant capacitor, where an output of the output rectifier section provides power to a load through output terminals and the output rectifier section on the mobile device. The primary IPT coil is connected in series with a primary resonant capacitor, which is connected in series with an active bridge section, the active bridge section is connected to a constant current source where the primary resonant capacitor and the active bridge section are at the fixed location. A controller regulates output voltage to the load by controlling switching of the active bridge section.

A system for IPT includes a primary inverter with an active bridge section with input terminals that receive power from a constant current source, where the active bridge section operates at a fixed switching frequency, a primary resonant capacitor connected in series with an output terminal of the active bridge section, and a primary IPT coil connected in series with the primary resonant capacitor. A mobile device includes a secondary IPT coil, a secondary resonant capacitor connected in series with the secondary IPT coil, and an output rectifier section connected in series with the secondary resonant capacitor, where an output of the output rectifier section provides power to a load through output terminals, and power is transferred wirelessly across a gap between the primary IPT coil, and a controller that regulates output voltage to the load. The controller regulates output voltage to the load by controlling switching of the active bridge section.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
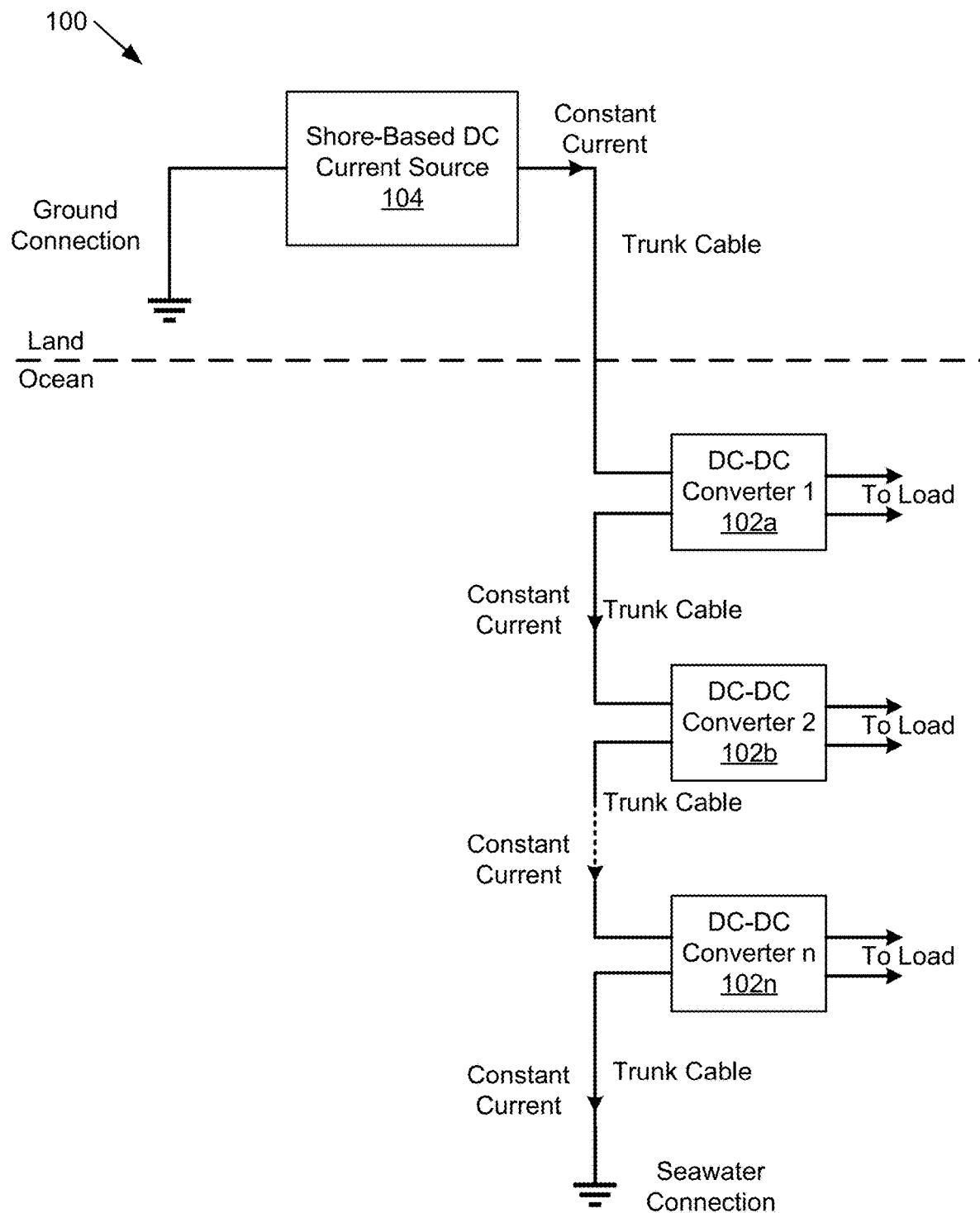
FIG. 1 is a schematic block diagram illustrating one embodiment of a system with DC-DC converters and a constant current source.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system and/or method. Accordingly, aspects of the present invention may take the form of an entirely hardware embodiment or an embodiment combining software (including firmware, resident software, micro-code, etc.) and hardware aspects that may all generally be referred to herein as a "circuit," "module," or "system."

Some of the functional units described in this specification may be labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of "A, B, and C." As used herein, "a member selected from the group consisting of" A, B, and C and combinations thereof" includes only A, only B, only C, a combination of A and B, a combination of B and C, a combination of A and C or a combination of A, B and C.

An apparatus for inductive power transfer ("IPT") includes an active bridge section with input terminals that receive power from a constant current source, where the active bridge section operates at a fixed switching frequency, a primary resonant capacitor connected in series with an output terminal of the active bridge section, and a primary IPT coil connected in series with the primary resonant capacitor, where power is transferred wirelessly between the primary IPT coil and a secondary IPT coil, and the secondary IPT coil is connected in series with a secondary resonant capacitor, which is connected in series with an output rectifier section that receives power from the secondary IPT coil and comprising output terminals for connection to a load. The apparatus includes a controller that regulates output voltage to the load, where the controller regulates output voltage to the load by controlling switching of the active bridge section.

In some embodiments, the controller regulates output voltage to the load using a symmetrical phase shift modulation of a phase shift angle between a first switching leg and a second switching leg of the active bridge section, wherein the first switching leg and the second switching leg each operate at a 50 percent duty cycle. In further embodiments, the controller regulates output voltage according to:

$$V_{out} = \frac{\pi^2 \omega_s M I_{in}}{8 \sin\left(\frac{\phi_{AB}}{2}\right)}$$

where $V_{out}$ is output voltage, $I_{in}$ is input current, M is mutual inductance between the primary IPT coil and the secondary IPT coil, and $\varphi_{AB}$ is the active bridge section phase shift angle. In other embodiments, the apparatus includes a transformer, with a turns ratio m, between the active bridge section and the primary resonant capacitor, where the controller regulates the output voltage according to:

$$V_{out} = \frac{m\pi^2 \omega_s M I_{in}}{8 \sin\left(\frac{\phi_{AB}}{2}\right)}.$$

In some embodiments, the active bridge section is a full active bridge and the output rectifier section comprises a full-bridge rectifier. In other embodiments, a fixed switching frequency of the active bridge section is equal to a primary resonant frequency of the primary resonant capacitor and an inductance of the primary IPT coil. In other embodiments, a secondary resonant frequency of the secondary resonant capacitor and an inductance of the secondary IPT coil matches the primary resonant frequency. In other embodiments, the output rectifier section comprises active switches. In other embodiments, the load includes a constant voltage source and in response to power flowing from the secondary IPT coil to the primary IPT coil, the controller adjusts switching of the switches in the output rectifier section to control power transferred to the constant current source by controlling voltage across the constant current source by adjusting a phase shift between a first switching leg and a second switching leg of the output rectifier section while the active bridge section operates at a constant phase shift.

In some embodiments, the output rectifier section is configured as a full bridge rectifier. In other embodiments, the primary IPT coil transfers power wirelessly to the secondary IPT coil across a gap. In other embodiments, the controller includes series-series compensation.

Another apparatus for IPT includes a secondary IPT coil on a mobile device where the secondary IPT coil receives power wirelessly from a primary IPT coil of a primary inverter in a fixed location, a secondary resonant capacitor connected in series with the secondary IPT coil where the secondary resonant capacitor is on the mobile device, and an output rectifier section connected in series with the secondary resonant capacitor, where an output of the output rectifier section provides power to a load through output terminals and the output rectifier section on the mobile device. The primary IPT coil is connected in series with a primary resonant capacitor, which is connected in series with an active bridge section, the active bridge section is connected to a constant current source where the primary resonant capacitor and the active bridge section are at the fixed location. A controller regulates output voltage to the load by controlling switching of the active bridge section.

In some embodiments, the controller regulates output voltage to the load using a symmetrical phase shift modulation of a phase shift angle between a first switching leg and a second switching leg of the active bridge section, where the first switching leg and the second switching leg each operate at a 50 percent duty cycle. In other embodiments, the apparatus includes a transformer between the active bridge section and the primary resonant capacitor and the controller regulates output voltage according to:

$$V_{out} = \frac{m\pi^2 \omega_s M I_{in}}{8 \sin\left(\frac{\phi_{AB}}{2}\right)}$$

where m is a turns ratio of the transformer, $V_{out}$ is output voltage, $I_{in}$ is input current, M is mutual inductance between the primary IPT coil and the secondary IPT coil, and φ is the active bridge section phase shift angle.

In other embodiments, the active bridge section includes a full active bridge and the output rectifier section includes a full-bridge rectifier. In other embodiments, a primary resonant frequency of the primary resonant capacitor and an inductance of the primary IPT coil matches a secondary resonant frequency of the secondary resonant capacitor and an inductance of the secondary IPT coil, and wherein the primary resonant frequency and the secondary resonant frequency matches a fixed switching frequency of the active bridge section. In other embodiments, the output rectifier section includes active switches and the load includes a constant voltage source and in response to power flowing from the secondary IPT coil to the primary IPT coil. The controller adjusts switching of the switches in the output rectifier section to control power transferred to the constant current source by controlling voltage across the constant current source by adjusting a phase shift between a first switching leg and a second switching leg of the output rectifier section while the active bridge section operates at a constant phase shift.

A system for IPT includes a primary inverter with an active bridge section with input terminals that receive power from a constant current source, where the active bridge section operates at a fixed switching frequency, a primary resonant capacitor connected in series with an output terminal of the active bridge section, and a primary IPT coil connected in series with the primary resonant capacitor. A mobile device includes a secondary IPT coil, a secondary resonant capacitor connected in series with the secondary IPT coil, and an output rectifier section connected in series with the secondary resonant capacitor, where an output of the output rectifier section provides power to a load through output terminals, and power is transferred wirelessly across a gap between the primary IPT coil, and a controller that regulates output voltage to the load. The controller regulates output voltage to the load by controlling switching of the active bridge section.

In some embodiments, the controller regulates output voltage to the load using a symmetrical phase shift modulation of a phase shift angle between a first switching leg and a second switching leg of the active bridge section, wherein the first switching leg and the second switching leg each operate at a 50 percent duty cycle.

FIG. 1 is a schematic block diagram illustrating one embodiment of a system 100 with DC-DC converters 102a-n (collectively or generically "102") and a constant current source 104. In the embodiment, the constant current source 104 is direct current ("DC") and is on a shore of an ocean or other body of salty or otherwise conductive water and a trunk cable feeds DC-DC converters 102, which are series connected. In other embodiments, the system 100 includes a wired neutral/ground. Each DC-DC converter 102 feeds a load, such as a sensor, a light, a vehicle, a camera, and the like.

The constant current source 104 is grounded on land and the trunk cable is grounded by a seawater connection. An advantage of a system 100 with a constant current source 104 feeding converters 102 is robustness against voltage drop over a long distance of the trunk cable. In addition, the system 100 includes robustness against cable faults where seawater serves as the current return. Each DC-DC converter 102 has a constant input current with a regulated output voltage. Other systems in other situations also benefit from a constant current source feeding one or more DC-DC converters 102.

In some embodiments, the converters 102 are parallel resonant converters or a similar topology and include an active bridge section with input terminals that receive power from a constant current source. In some embodiments, the active bridge section operates at a fixed switching frequency. The parallel resonant converter ("PRC") includes resonant section with a resonant inductor, transformer and a resonant capacitor where the resonant section is connected to an output of the active bridge section, and an output rectifier section that receives power from the resonant section and includes output terminals for connection to a load. The parallel resonant converter includes, in some embodiments, a controller that regulates output voltage to the load. The controller regulates output voltage to the load by controlling switching of the active bridge section. In some embodiments, the fixed switching frequency of the active bridge section matches a resonant frequency of the resonant section.

Feeding the DC-DC PRC converters 102 (or converters 102) with a constant current source creates challenges during startup and shutdown of the converters 102. In addition, failures, transients, etc. may also cause problems for the converters 102. For example, if switches of the converters 102 stop operating, input voltage across an input capacitor could rise dramatically.

Figure 2:
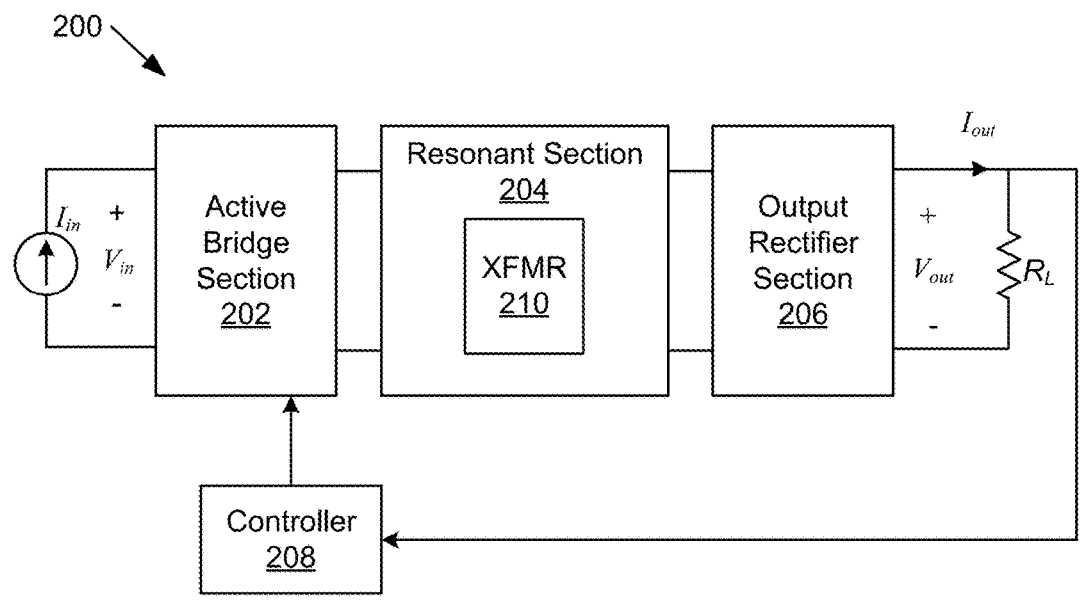
FIG. 2 is a schematic block diagram illustrating one embodiment of a DC-DC parallel resonant converter ("PRC") with a constant current input and a regulated output voltage.

FIG. 2 is a schematic block diagram illustrating one embodiment of a DC-DC PRC 200 with a constant current input $I_{in}$ and a regulated output voltage $V_{out}$. The PRC 200 includes an active bridge section 202 with input terminals that receive power from the constant current source $I_{in}$ where the active bridge section 202 operates at a fixed switching frequency $f_s$. In one example, the active bridge section 202 includes a full active bridge with a first switching leg with two switches $Q_1$ and $Q_2$ and a second switching leg with two additional switches $Q_3$ and $Q_4$ where the resonant section 204 connects to a connection point A between switches $Q_1$ and $Q_2$ of the first leg and connects to a connection point B between switches $Q_3$ and $Q_4$ of the second leg. In another example, the active bridge section 202 is a half-bridge with a single switching leg with two switches $Q_1$ and $Q_2$. In other embodiments, the active bridge section 202 includes another active bridge topology.

The DC-DC PRC 200 includes a resonant section 204 with a resonant inductor $L_r$, a transformer 210 and a resonant capacitor $C_r$. The resonant section 204 is connected to an output of the active bridge section 202. The DC-DC PRC 200 includes an output rectifier section 206 that receives power from the resonant section 204 and includes output terminals for connection to a load $R_L$. In some embodiments, the output rectifier section 206 is a diode full-bridge rectifier. In other embodiments, the output rectifier section 206 is a diode half-bridge voltage doubler. In other embodiments, the output rectifier section 206 is a diode half-bridge rectifier. In other embodiments, the output rectifier section 206 includes an active rectifier topology with active switches. One of skill in the art will recognize other rectifier topologies for the output rectifier section 206.

The DC-DC PRC 200 includes a controller 208 that regulates output voltage to the load $R_L$ where the controller 208 regulates output voltage to the load by controlling switching of the active bridge section 202. By regulating output voltage, the DC-DC PRC 200 provides constant output voltage to the load $R_L$. In one embodiment, the fixed switching frequency $f_s$ of the active bridge section 202 matches a resonant frequency $f_o$ of the resonant section 204, which provides a mechanism for simplified control.

The DC-DC PRC 200 includes a transformer 210 between the resonant inductor $L_r$ and the resonant capacitor $C_r$ with a turns ratio of n:1. The resonant capacitor $C_r$ is connected in parallel with a secondary winding of the transformer 210. Selection of the transformer turns ratio is useful in managing an output voltage range and component ratings of the DC-DC PRC 200 and, in some embodiments, provides isolation between the input and the output of the DC-DC PRC 200.

Figure 3:
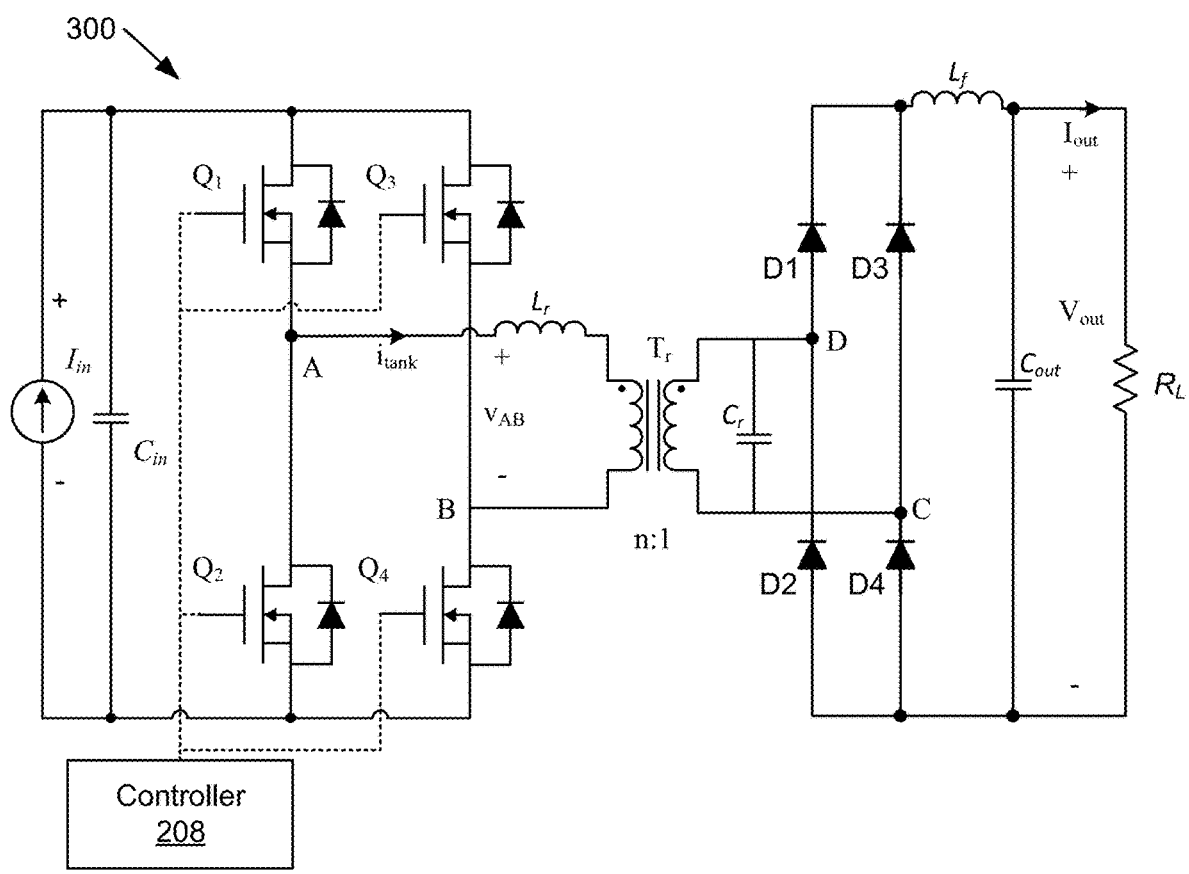
FIG. 3 is a schematic block diagram illustrating another embodiment of a DC-DC PRC with a constant current input and a regulated output voltage with a transformer with a single secondary winding.

FIG. 3 is a schematic block diagram illustrating another embodiment of a DC-DC PRC 200 with a constant current input $I_{in}$ and a regulated output voltage $V_{out}$ with a transformer $T_r$ with a single secondary winding. In the embodiment, the active bridge section 202 described above is a full-bridge switching section that includes four switches Q1-Q4. In some embodiments, each switch Q1-Q4 is metal-oxide semiconductor field-effect transistor ("MOSFET"). In other embodiments, the switches Q1-Q4 are other types of semiconductor switches or other types of switches capable of operating at the chosen switching frequency. The full-bridge switching section is in an H-bridge configuration with two switches Q1, Q2 in a first switching leg and two switches Q3, Q4 in a second switching leg. In some embodiments, the PRC 300 may also include an input capacitor $C_{in}$ that helps to smooth voltage ripple on the input voltage $V_{in}$ caused by switching of the switches Q1-Q4 of the full-bridge switching section.

The PRC 300 includes a resonant section 204 with a resonant inductor $L_r$, a transformer $T_r$ and a resonant capacitor $C_r$ in parallel with the secondary of the transformer $T_r$ where the resonant section 204 is connected to an output of the active bridge section 202 at connection point A located between the switches Q1, Q2 of the first switching leg and connection point B located between the switches Q3, Q4 of the second switching leg. In other embodiments, the resonant capacitor $C_r$ is connected in parallel with the primary winding. In some embodiments, the resonant inductor $L_r$ may be split into two parts, but may be a single inductor. The PRC 300 also includes an output rectifier section 206 that receives power from the resonant section 204 and includes output terminals for connection to a load $R_L$. In the depicted embodiment, the output rectifier section 206 is a diode full-bridge rectifier that includes a first diode $D_1$, and a second diode $D_2$, a third diode $D_3$ and a fourth diode $D_4$ as depicted in FIG. 3. The output rectifier section 206 also includes a filter inductor $L_f$ and an output capacitor $C_{out}$ that helps to smooth voltage ripple of the output voltage $V_{out}$.

In some embodiments, the PRC 300 includes a controller 208 that regulates output voltage $V_{out}$ to the load $R_L$, where the controller 208 regulates output voltage $V_{out}$ to the load $R_L$ by controlling switching of the switches Q1-Q4 of the active bridge section 202 by way of controlling a phase shift angle α, as explained below. In some embodiments, where the switching frequency of the active bridge section 202 is fixed, the fixed switching frequency $f_s$ matches a resonant frequency $f_o$ of the resonant section 204, which provides benefits that are described below.

Figure 4:
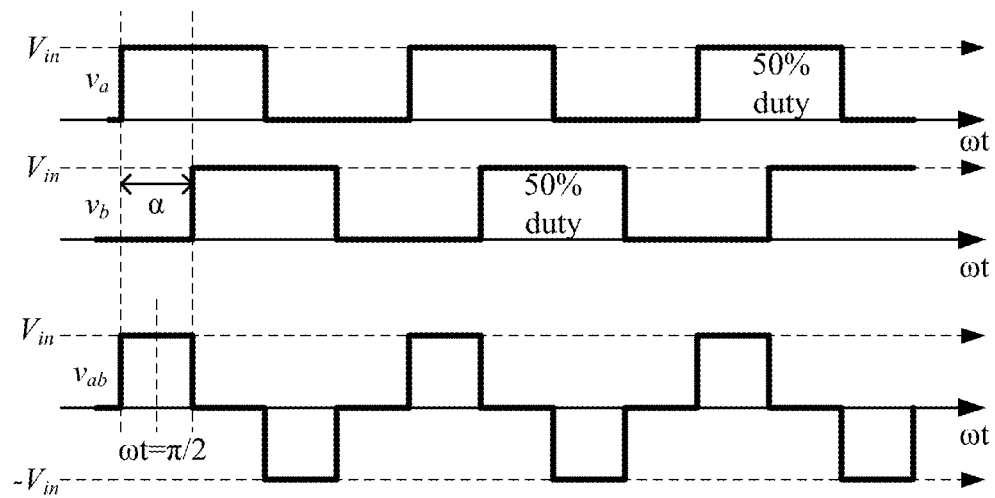
FIG. 4 is an ideal waveform diagram demonstrating a phase shift angle.

On the primary side of the converter 300, MOSFETs $Q_1$-$Q_4$ form the DC-AC (alternating current) inverting stage, which operates at DC input voltage $V_{in}$, with a symmetrical phase shift modulation between leg A and leg B with phase shift angle α and produces a quasi-square wave voltage ($v_{AB}$) at the inverter output, as shown in FIG. 4. The resonant tank is formed by the resonant inductor $L_r$ and resonant capacitor $C_r$ placed on the secondary side of an n:1 isolation transformer. The voltage across the resonant capacitor $C_r$ is rectified and then filtered by an output filter stage formed by an inductor $L_f$ and capacitor $C_{out}$. Input power from the constant current source $I_{in}$ is processed by the PRC 300 to regulate the output voltage across the load $R_L$ at a constant value of output voltage $V_{out}$.

Figure 5:
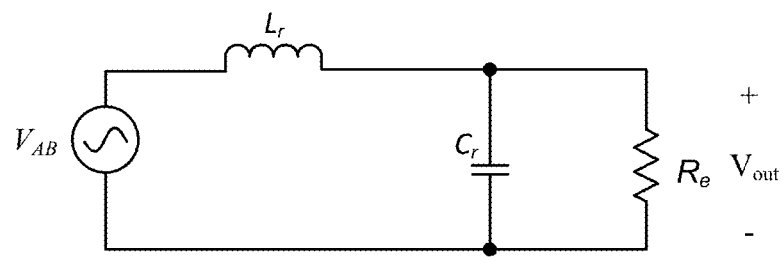
FIG. 5 is a schematic block diagram illustrating one embodiment of an equivalent circuit diagram for a PRC converter.

The following analysis assumes that the PRC 300 is ideal without any loss. Also, the analysis assumes that a loaded quality factor of the resonant tank 204 is high enough to filter out the harmonics generated from the active bridge section 202 and the diode rectifier of the output rectifier section 206 operates under continuous conduction mode. Test results show that the PRC 300 behaves very similar to an idealized model. Using a fundamental approximation technique, an equivalent circuit of the AC stage in the PRC 300 can be drawn as shown in FIG. 5, where the ratio of output voltage to input voltage can be given as:

$$\frac{v_o}{v_{AB}} = \frac{1}{1 + s\frac{L_r}{R_e} + s^2 L_r C_r} = \frac{1}{1 + \frac{s}{Q\omega_o} + \frac{s^2}{\omega_o^2}}, \quad (1)$$

and the amplitude (peak voltage) of the input voltage $V_{in}$ and output voltage $V_{out}$ are given by:

$$|v_{AB,pk}| = \frac{4}{\pi}\sin\left(\frac{\alpha}{2}\right)V_{in} \text{ and } |v_{o,pk}| = \frac{n\pi}{2}V_{out}, \quad (2)$$

where the variable used are defined as:

$$\omega_o = \frac{1}{\sqrt{L_r C_r}}, \; C_r = \frac{C_r'}{n^2}, \; Z_o = \sqrt{\frac{L_r}{C_r}}, \quad (3)$$

$$R_e = \frac{n^2 \pi^2}{8} R_L, \; Q = \frac{R_e}{Z_o}, \; F = \frac{\omega_s}{\omega_o} = \frac{f_s}{f_o}. \quad (4)$$

Here, $\omega_o$ is the angular resonant frequency, $Z_o$ is the characteristic impedance of the resonant tank, Q is the loaded quality factor of the tank and F is the normalized switching frequency.

With power balance from input to output of the converter, the steady state input voltage can be represented in terms of output voltage as:

$$V_{in} = \frac{P_{out}}{I_{in}} = \frac{V_{out}^2}{I_{in} R_L}. \quad (5)$$

Substituting equation (2) into equation (1) and utilizing equation (5) the steady state DC output voltage can be derived as:

$$V_{out} = \frac{Z_o I_{in}}{n \sin\left(\frac{\alpha}{2}\right)} \sqrt{F^2 + Q^2(1 - F^2)^2}, \quad (6)$$

If the switching frequency ($f_s$) of the converter is chosen to be equal to the resonant frequency ($f_o$) of the tank i.e. at F=1, then it can be derived from equation (6) that the output DC voltage becomes independent of Q and as a result independent of $R_L$. The output voltage thus can be given by:

$$V_{out} = \frac{Z_o I_{in}}{n \sin\left(\frac{\alpha}{2}\right)}. \quad (7)$$

From equation (7), it can be observed that for a given input current, output voltage, transformer turns ratio and the steady state control angle $\alpha$, $Z_o$ can be easily calculated from which the tank components can be designed. In addition, it can be seen from equation (5), that with constant current input, the input voltage varies with load. The final expression of input voltage is given by:

$$V_{in} = \frac{Z_o^2 I_{in}}{n^2 \sin^2\left(\frac{\alpha}{2}\right) R_L}. \quad (8)$$

The output power $P_{out}$ of the converter for a given $R_L$, can be given by:

$$P_{out} = \frac{Z_o^2 I_{in}^2}{n^2 \sin^2\left(\frac{\alpha}{2}\right) R_{load}} \left[F^2 + Q^2(1 - F^2)^2\right]. \quad (9)$$

From equation (9), it should be noted that with F=1, for a given load resistor $R_L$, $P_{out}$ is minimum with $\alpha=180°$, and $P_{out}$ as well as $V_{out}$ go higher as α is reduced, which is opposite of constant input voltage based PRC. It should also be noted that operating with switching frequency equal to resonant frequency also eliminates the limitation of minimum power operation of the converter with constant current input.

For design of the PRC 300, a first step is to find components of the resonant tank 204. For a given input current $I_{in}$ and output voltage $V_{out}$, transformer turn ratio n, and with α chosen to be 120° the characteristic impedance $Z_o$ of the tank can be found from equation (7). For a selected switching frequency, which is also the resonant frequency, the resonant tank components can be found from:

$$L_r = \frac{Z_o}{\omega_o} = \frac{Z_o}{2\pi f_o}, \quad (10)$$

$$C_r = \frac{1}{\omega_o Z_o} \Rightarrow C_r' = \frac{n^2}{\omega_o Z_o}. \quad (11)$$

The resonant tank capacitor is placed at the secondary side of the transformer so that the leakage inductance of the transformer can be absorbed into the tank inductance $L_r$. The rms current in the tank inductor $i_{Lr\_rms}$ and rms voltage across the resonant capacitor $v_{Cr\_rms}$ are given by:

$$i_{Lr\_rms} = \frac{n\pi}{2\sqrt{2}} \frac{V_{out}}{Z_o} \sqrt{1 + \frac{1}{Q^2}}, \quad (12)$$

$$v_{Cr\_rms} = \frac{\pi}{2\sqrt{2}} V_{out}. \quad (13)$$

The choice of transformer turns ratio impacts the maximum rms current in the tank current which occurs at highest load. From equation (7) and equation (12) transformer turns ratio can found out by:

$$n = \frac{\frac{8}{\pi^2} \frac{V_{out}\sin\left(\frac{\alpha}{2}\right)}{R_{L\_min} I_{in}}}{\sqrt{\left(I_{Lr\_rms\_max} \frac{2\sqrt{2}}{\pi} \frac{\sin\left(\frac{\alpha}{2}\right)}{I_{in}}\right)^2 - 1}}, \quad (14)$$

where, $I_{Lr\_rms\_max}$ is the maximum rms current in the tank inductor and $R_{L\_min}$ is the minimum load resistance, corresponding to maximum load at the output. With a design choice of $I_{Lr\_rms\_max}$, the transformer turns ratio can be optimized from equation (14). After determining n, resonant tank component values can be found following equations (7), (10) and (11).

The primary side inverter devices block voltage equal to input DC voltage $V_{in}$ whose maximum value is decided based on the maximum load and efficiency (η) of the converter and can be found out by:

$$V_{pri\_FET} \geq \frac{P_{out\_max}}{\eta I_{in}}. \quad (15)$$

The rms current rating for the MOSFETs are determined by the tank current which can be found out from equation (12). On the other hand, the secondary side rectifier devices see a reverse voltage equal to the peak value of voltage across resonant capacitor and thus the voltage rating for the rectifier is given by $$V_{sec\_rect} \geq \frac{\pi V_{out}}{2}. \quad (16)$$

The average value of current through the rectifier is equal to the output current which can be easily found out from maximum load power and output voltage $V_{out}$.

It is established above that the PRC 300 behaves as a natural voltage source at the output of the PRC 300 when operated at switching frequency equal to the resonant frequency and hence a control scheme that varies the switching frequency to regulate output voltage is not preferred. It can be seen from equation (7) that for the designed converter, the output voltage can be controlled by the phase shift angle α and hence phase shift modulation strategy is preferred.

For a series resonant converter whose primary side inverter is similar in operation to the PRC 300, switches in the leading leg (leg A) need zero voltage switching ("ZVS") assistance whereas, lagging leg (leg B) achieves ZVS by the tank current itself, which is also applicable to the PRC 300. An active ZVS assisting circuit consisting of an auxiliary half bridge leg and ZVS assisting inductor $L_{ZVS}$, may be used to achieve ZVS turn ON of the MOSFETs in leg A. By controlling the phase shift angle between leg A and this auxiliary leg, ZVS assistance is controlled, over the load range.

A prototype PRC 300 operating at 250 kHz was constructed with the parameters shown in Table I. The hardware setup of the PRC 300 operates from a 1 A DC current source and is tested for a power level up to 450 W. The hardware converter was tested to determine output voltage characteristics in steady state and transient conditions to verify its load independent, constant output voltage characteristics.

TABLE I

| Component | Value |
| --- | --- |
| $L_r$ (μH) | 264.6 |
| $C_r$ (nF) | 24.5 |
| $f_s$ (kHz) | 250 |
| $L_{ZVS}$ (μH) | 55 |
| $I_g$ (A) | 1 |
| $V_{out}$ (V) | 120 |
| $P_{load}$ (W) | 50-400 |
| Transformer turn ratio n:1 | 4:1 |
| Main MOSFETS (SiC) | C2M1000170D |
| $L_f$ (μH) | 80 |
| $C_f$ (μF) | 2.35 |
| Diode Bridge | GHXS020A060S-D1 |

Figure 6:
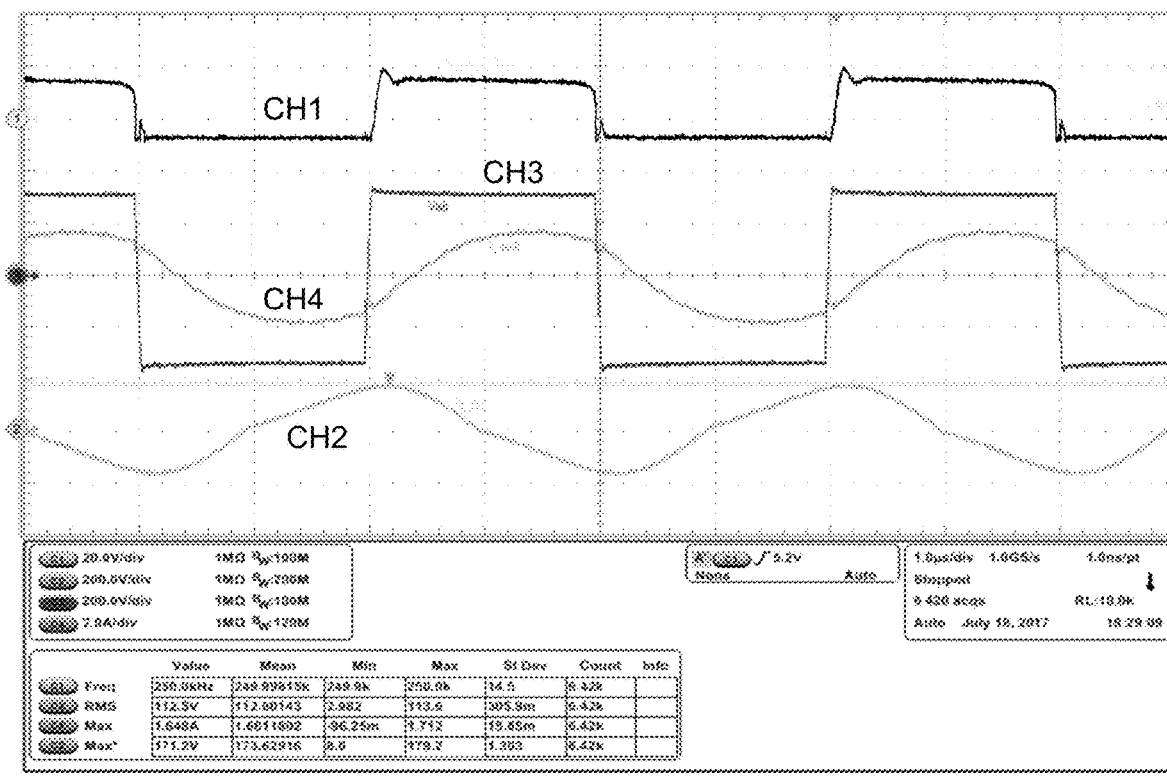
FIG. 6 depicts PRC operating waveforms with a phase shift angle $\alpha=180°$ (a) and $\alpha=120°$ (b) at $R_L=34$ ohms.
Figure 6:
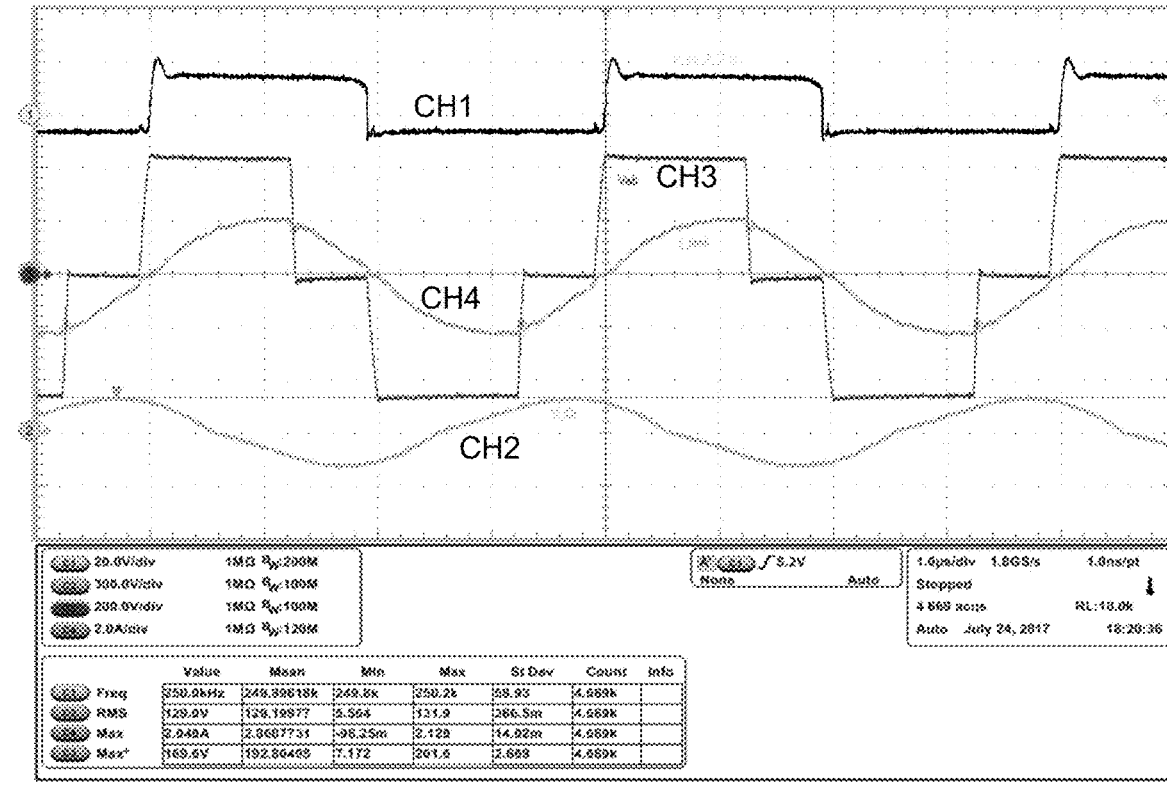

Hardware test results of the PRC 300 during steady state operating conditions are shown in FIG. 5 and FIG. 6. Steady state operating waveforms of the converter are shown for α=180° and α=120° in FIG. 5(*a*) and FIG. 5(*b*), respectively. The load was 34 ohms. In FIG. 5, trace CH1 is for a gate to source voltage of top MOSFET $Q_1$ in leg A, trace CH3 is the primary side inverter output voltage $V_{AB}$, trace CH4 is the current in the resonant inductor and trace CH2 is the voltage across the resonant capacitor. For α=180°, no ZVS assisting circuit is employed whereas, for α=120°, an active ZVS assisting circuit is used and the ZVS assisting current is adjusted so that the MOSFETs $Q_1$, $Q_2$ in the primary side bridge achieve ZVS.

Figure 7:
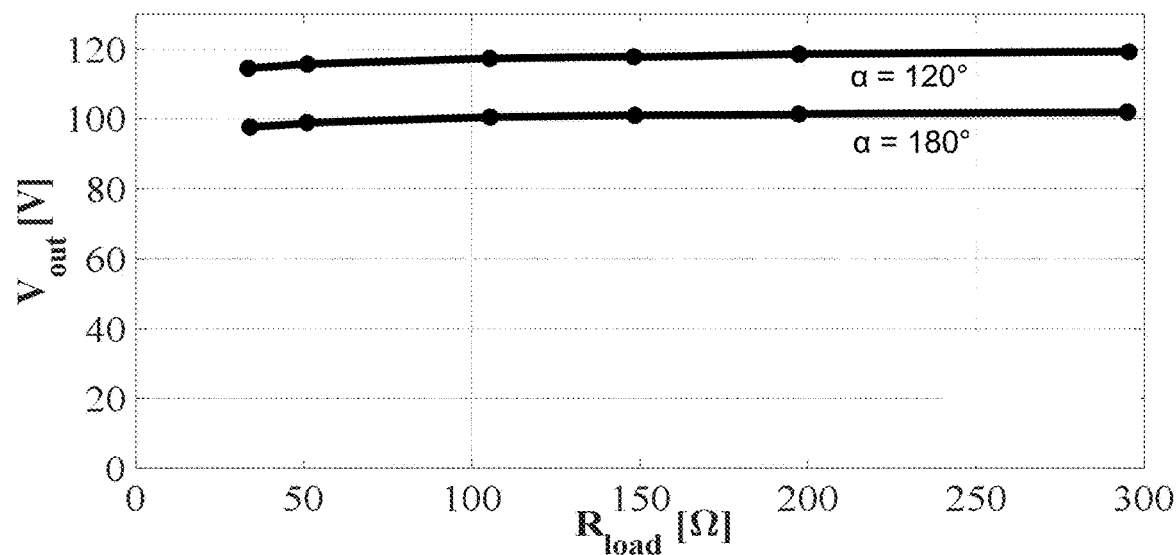
FIG. 7 depicts open loop output characteristics of a PRC with experimental steady state DC output voltage $V_{out}$ vs. load resistance $R_L$ at $\alpha=180°$ and $\alpha=120°$.

The PRC 300 was also tested for to determine output characteristics by varying the load resistance $R_L$, at two different control angles; minimum power operation angle α=180° and desired operating angle α=120°. FIG. 7 shows the steady state DC output voltage $V_{out}$ of the PRC 300 with respect to variation in load resistance $R_L$. In FIG. 7, the bottom plot shows output voltage $V_{out}$ vs. load resistance $R_L$ for α=180° and the upper plot is for α=120°. It can be seen from the plots in FIG. 7, that the output voltage $V_{out}$ remains almost constant over the range of load resistance $R_L$. This shows that the PRC 300 operates as a natural voltage source at the output with a constant input current source $I_{in}$ and variable input voltage $V_{in}$, with load $R_L$. The small droop in the plots of FIG. 7 are due to series non-idealities e.g. equivalent series resistance ("ESR") present in the circuit that can be easily taken care of by the closed loop controller with small variation in control angle α.

Figure 8:
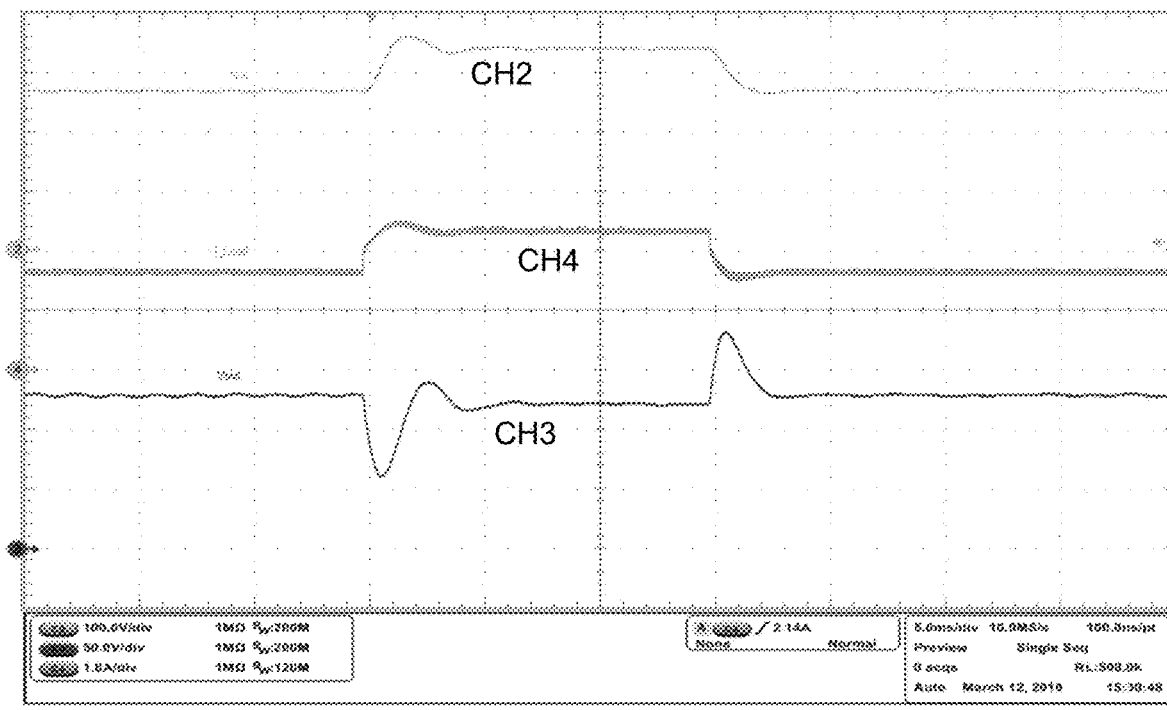
FIG. 8 depicts input and output DC signals under load transient of 1.7 amperes ("A") (about 200 watts ("W")) to 2.3 A (about 275 W) and back to 1.7 A, for the PRC operating in open loop.

The PRC 300 was also tested for transient load conditions and the results are presented in FIG. 8. For this test, the output current of the converter is changed from 1.7 A (about 200 W) to 2.3 A (about 275 W) and back to 1.7 A while the PRC 300 was operating in open loop with a fixed phase shift angle α. In FIG. 8, the top plot CH2 shows the DC input voltage $V_{in}$, the middle waveform CH4 is the output load current $I_{out}$ and the DC output voltage $V_{out}$ is shown by bottom trace CH3. The results in FIG. 8 show that the output voltage $V_{out}$ goes through overshoot or undershoot under load change transients, but settles back to its designed value of 120 V, conforming to the load independent constant output voltage characteristics.

In a constant current input DC distribution system, input voltage of a power converter varies with the load. A DC-DC PRC 200, 300, operating from constant current input, can be designed to achieve a steady state constant voltage output behavior across a load range. Steady state input and output quantities are derived for the PRC 300, with fundamental harmonic approximation along with design of resonant tank components and their desired ratings. Simulation results under load transients also confirms the constant output voltage characteristics of the PRC 200/300 making it suitable for constant current input to constant voltage output converter.

Figure 9A:
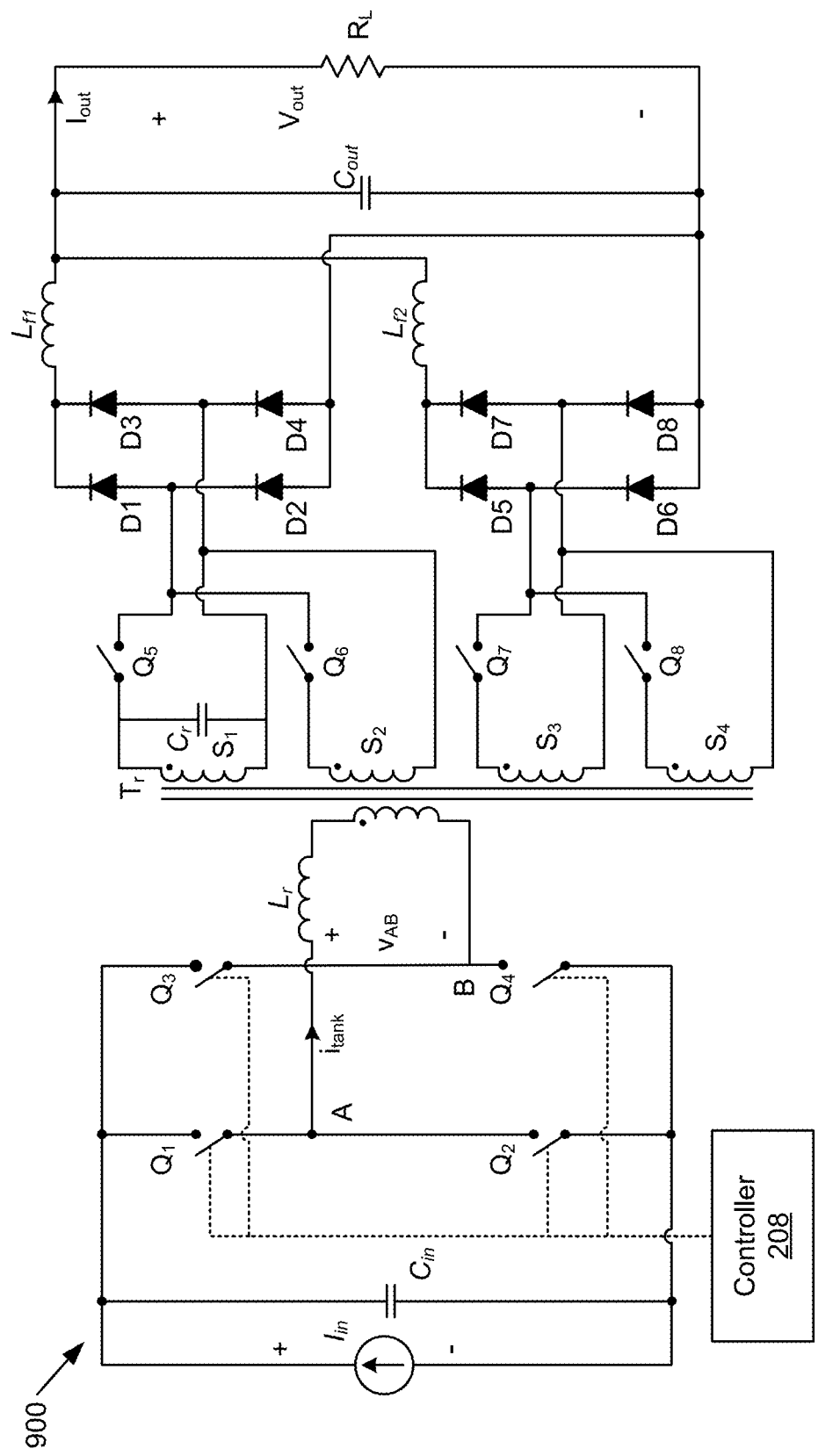
FIG. 9A is a schematic block diagram illustrating another embodiment of a DC-DC PRC with a constant current input and a regulated output voltage with a transformer with four secondary windings.
Figure 9B:
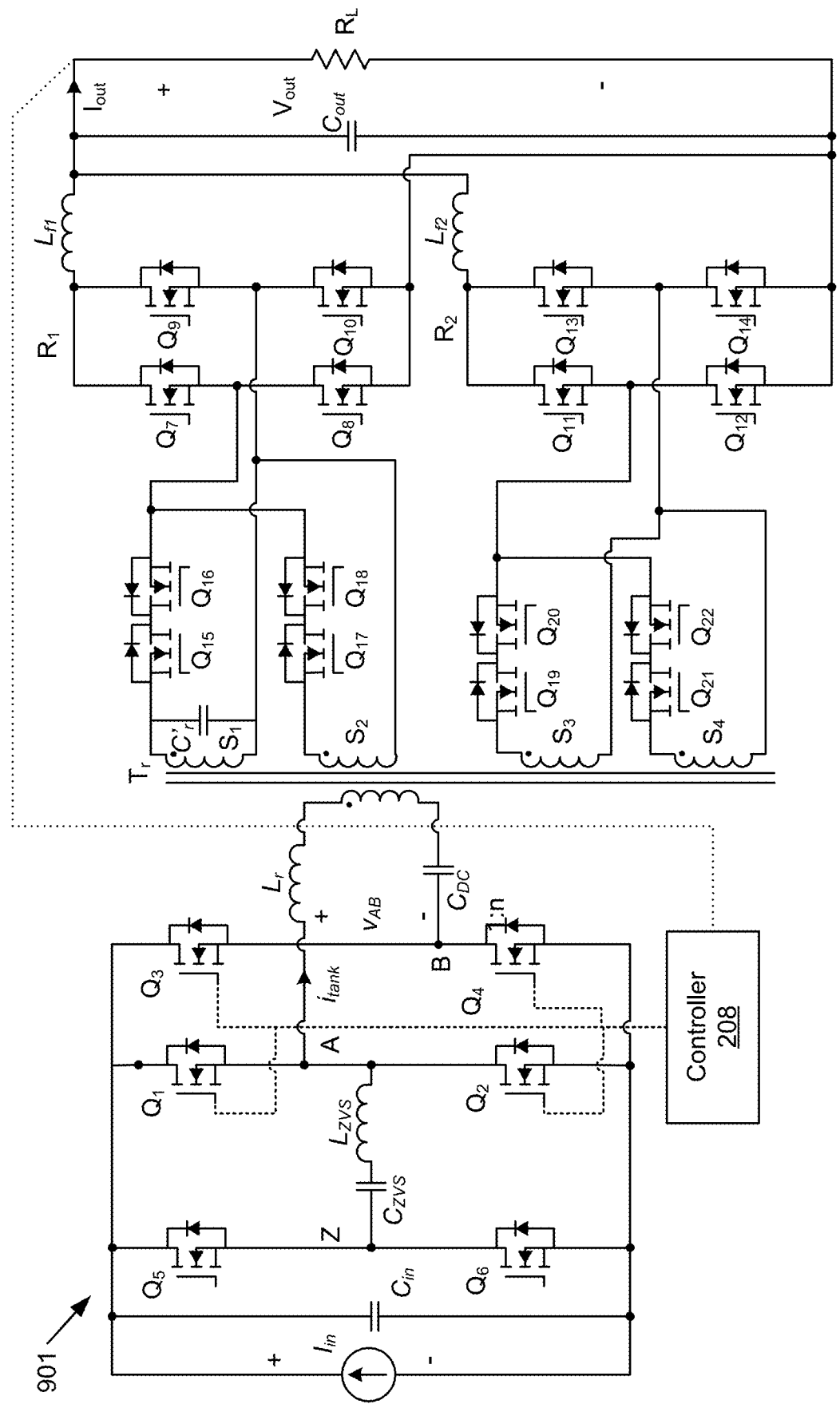
FIG. 9B is a schematic block diagram illustrating another embodiment of a DC-DC PRC with a constant current input and a regulated output voltage $V_{out}$ with a transformer $T_r$ with four secondary windings and metal oxide semiconductor field-effect transistors ("MOSFETs") replacing switches and diodes of the PRC of FIG. 9A.

FIG. 9A is a schematic block diagram illustrating another embodiment of a DC-DC PRC 900 with a constant current input and a regulated output voltage $V_{out}$ with a transformer $T_r$ with four secondary windings $S_1$-$S_4$. FIG. 9B is a schematic block diagram illustrating another embodiment of a DC-DC PRC 901 with a constant current input and a regulated output voltage $V_{out}$ with a transformer $T_r$ with four secondary windings $S_1$-$S_4$ and MOSFETs replacing switches and diodes of the PRC of FIG. 9A. Note that the switches $Q_1$-$Q_8$ in the active bridge section 202 and in the resonant section 204 of the PRC 900 of FIG. 9A may be MOSFETs or may be another semiconductor switch or other switch. The output rectifier section 206 of the PRC 901 of FIG. 9B includes active switches $Q_7$-$Q_{14}$, which allow the PRC 902 to be bidirectional, may reduce losses, etc., but may be diodes, such as the diodes $D_1$-$D_4$ of the PRC 900 of FIG. 9A.

The converter topologies of the PRC 900 and PRC 901 of FIGS. 9A and 9B present a new topology that leverages the load independent output voltage characteristics of the PRC topology and incorporates a multi-winding transformer and an output switch network that together minimize component stress and improve efficiency over a wide range of required operating conditions. The PRC 901 of FIG. 9B was modeled and simulated and hardware was constructed and tested and operation of the proposed topology is validated with simulation results and test results. Experimental results are presented in FIGS. 11 and 12 for a hardware prototype with 250 kHz switching frequency, 1 A constant input current and a regulated output voltage controlled from 80 V to 250 V over the full load range from 50 W to 500 W.

For the PRC of FIG. 9A, when a switch (e.g. $Q_5$) is selected, one of the two rectifiers (e.g. diodes D1-D4) is connected to a transformer secondary winding (e.g. $S_1$), which provides power to the load $R_L$ while the other switches (e.g. $Q_6$-$Q_8$) are disconnected so that the other secondary windings (e.g. $S_2$-$S_4$) do not provide power. Each secondary winding $S_1$-$S_4$ corresponds to a particular output voltage range. The depicted PRC 900 includes two rectifier sections (e.g. D1-D4 and D5-D8), which increases efficiency by allowing diodes (e.g. D5-D8) of a rectifier to be selected appropriate for a particular voltage range associated with the secondary windings (e.g. $S_3$-$S_4$) connected to the rectifier.

In the PRC 901 of FIG. 9B, the switches $Q_5$-$Q_8$ are replaced with back-to-back MOSFETs $Q_{15}$-$Q_{22}$, which are configured to block voltage in both directions. In addition, the diodes D1-D8 are replaced with MOSFETs $Q_7$-$Q_{14}$, which, in some embodiments, allows bi-directional power flow through the PRC 901 and may also reduce switching losses. The PRC 901 of FIG. 9B also includes an additional DC blocking capacitor $C_{DC}$ and a zero voltage switching ("ZVS") circuit, which are explained below.

The circuit topology of the proposed converter is shown in FIGS. 9A and 9B. The converter is a parallel resonant converter ("PRC") with a multi-winding transformer $T_r$ whose output can be selected through a switch network. In some embodiments, only one transformer output and rectifier and filter circuit is selected at a time based on the desired output voltage. This approach allows the transformer secondaries $S_1$-$S_4$ and associated switches to be optimized for their current rating according to their different output voltages.

The PRC 901 of FIG. 9B is controlled from its primary side bridge, constituted by MOSFETs $Q_1$-$Q_4$, which operates with phase shift modulation between two legs and produces a quasi-square wave output $v_{AB}$ whose amplitude is decided by the DC input voltage $V_{in}$. The resonant inductor $L_r$ and resonant capacitor $C'_r$ form a parallel resonant tank, while the capacitor $C_{DC}$ serves as a DC blocking capacitor to avoid transformer saturation due to any non-ideality in the active bridge section 202. The resonant capacitor $C'_r$ is linked to each secondary winding $S_1$-$S_4$ through the transformer $T_r$. In some embodiments, more than one secondary winding $S_1$-$S_4$ include a capacitor connected in parallel and the combined capacitance of the capacitors forms the resonant capacitor $C'_r$. The input capacitor $C_{in}$ provides filtering for high frequency AC current demanded by the converter and maintains a steady DC voltage at the input, at a given load. Auxiliary leg Z along with inductor $L_{ZVS}$ and capacitor $C_{ZVS}$ form a ZVS assisting circuit which is used to achieve ZVS for the leading leg (leg A). An active approach is used over passive assisting technique considering the wide operating range. Other active or passive ZVS assisting circuits may also be used to achieve ZVS for the entire operational space.

The switch network on the secondary side of the transformer, formed by MOSFET pairs $Q_{15}$, $Q_{16}$ through $Q_{21}$, $Q_{22}$ is used to select the suitable secondary winding to process the power through the rectifier stage, based on the desired output voltage. A first rectifier $R_1$ (e.g. $Q_7$-$Q_{10}$) and a first filter (first filter inductor $L_{f1}$ and the output capacitor $C_{out}$) are active when power is processed through either winding $S_1$ or $S_2$. A second rectifier $R_2$ (e.g. $Q_{11}$-$Q_{14}$) and a second filter (second filter inductor $L_{f2}$ and the output capacitor $C_{out}$) are active when power is processed through winding $S_3$ or $S_4$. MOSFETs $Q_7$-$Q_{14}$ are operated to perform synchronous rectification, in one embodiment, in the output rectifier stage 206 to reduce conduction loss. The output capacitor $C_{out}$ performs final filtering of high frequency ripple at the DC output voltage.

The operating modes, based on the set output voltage, are summarized in Table II with transformer turns ratio and r defined as:

TABLE II

MODES OF OPERATION OF THE CONVERTER

| Modes of operation | Active switches in switch network | Active transformer windings | Output voltage range |
|---|---|---|---|
| 'n$_1$' | $Q_{21}$, $Q_{22}$ | P, $S_1$, $S_4$ | $V_{min}$ – $V_{min}$*r |
| 'n$_2$' | $Q_{19}$, $Q_{20}$ | P, $S_2$, $S_4$ | $V_{min}$*r – $V_{min}$*r$^2$ |
| 'n$_3$' | $Q_{17}$, $Q_{18}$ | P, $S_3$, $S_4$ | $V_{min}$*r$^2$ – $V_{min}$*r$^3$ |
| 'n$_4$' | $Q_{15}$, $Q_{16}$ | P, $S_4$ | $V_{min}$*r$^3$ – $V_{min}$*r$^4$ |

$$r = \left(\frac{V_{max}}{V_{min}}\right)^{\frac{1}{m}} \quad (17)$$

$$n_1:n_2:n_3:n_4 = 1:r:r^2:r^3, \quad (18)$$

where, m is the number of secondary windings and $V_{max}$ and $V_{min}$ are the range of desired output voltage. Since the resonant capacitor is connected to transformer winding $S_4$, it is in operation in all the operating modes. By appropriate selection of a transformer secondary network, stress in primary side components is limited irrespective of output voltage setting.

With fundamental harmonic approximation, if a PRC is operated at switching frequency ($f_s$) equal to its resonant frequency ($f_o$), then the steady state output voltage becomes load independent when the PRC 900, 901 is powered from a constant current source $I_{in}$. The output voltage $V_{out}$ of the PRC 900, 901 in this scenario is given by equations 3 and 7 above.

The benefit of constant output voltage characteristics of the PRC 900, 901 is utilized here to achieve constant voltage at the output with a narrow (ideally zero) variation in control angle α. However, since each of the transformer windings is used for a range of output voltage (see equation (17)), the phase shift angle α, between leg A and leg B, is set according to the output voltage reference, following equation (7).

To design components for the PRC 901, the rms value of tank inductor current and tank capacitor voltage (on winding 'S$_4$') can be given by:

$$i_{Lr\_rms} = \frac{n\pi}{2\sqrt{2}} \frac{V_{out}}{Z_o} \sqrt{1 + \frac{1}{Q^2}}, \tag{19}$$

$$v_{C'r\_rms} = \frac{n_4}{n_P} \frac{n\pi}{2\sqrt{2}} V_{out}, \tag{20}$$

where, Q is the loaded quality factor of the tank and is defined in equation (4) above.

Voltage stress across resonant capacitor $V_{Cr\_rms}$, is dictated directly by $V_{out}$. With max voltage at the output, coming from winding S$_4$, the maximum voltage across resonant capacitor $v_{Cr\_rms}$ can be determined by:

$$v_{Cr\_rms\_max} = \frac{\pi}{2\sqrt{2}} V_{max} \tag{21}$$

From equation (19), imposing a limitation on maximum $i_{Lr\_rms}$, with maximum $V_{out}$ at maximum load, gives a relationship between n and $Z_o$. Then, from equation (7), another relationship between n and $Z_o$, can be found with minimum output voltage from S$_4$, $V_{min}*r^3$, at a chosen α. Thus, both n and $Z_o$ can be uniquely determined. And, once n is determined for one of the secondary windings, from equation (18), the turns ratio can be determined for all the windings. The turns ratio of winding S$_4$ to primary winding can thus be given by:

$$\frac{n_P}{n_4} = \frac{\frac{8}{\pi^2} \frac{V_{max} \sin\left(\frac{\alpha_{min}}{2}\right)}{R_{L\_min} I_{in}}}{\sqrt{\left[I_{Lr\_rms\_max} \frac{2\sqrt{2} \sin\left(\frac{\alpha_{min}}{2}\right)}{\pi I_{in}}\right]^2 - 1}}, \tag{22}$$

where, $I_{Lr\_rms\_max}$ is the maximum rms current in the tank inductor and $R_{L\_min}$ is the minimum load resistance, corresponding to maximum load at the output, $\alpha_{min}$ is the minimum control angle of operation corresponding to maximum $V_{out}$. Once the transformer turns ratio is known, $Z_o$ can be evaluated from equation (7) and consequently the resonant tank components can be evaluated by:

$$L_r = \frac{Z_o}{\omega_o}, \tag{23}$$

$$C_r = \frac{1}{\omega_o Z_o} \Rightarrow C'_r = \left(\frac{n_P}{n_4}\right)^2 \frac{1}{\omega_o Z_o}. \tag{24}$$

where $\omega_o$ is the angular resonant frequency.

The semiconductor devices on the primary and secondary side of the converter can be selected based on the ratings described above in relation to the PRC 300 of FIG. 3. Note that the components present in the first rectifier R$_1$ and the first filter in FIG. 9B are low voltage high current rated whereas components present in the second rectifier R$_2$ and the second filter are relatively higher voltage and lower current rated and thus utilization of components' rating remains high.

Figure 10:
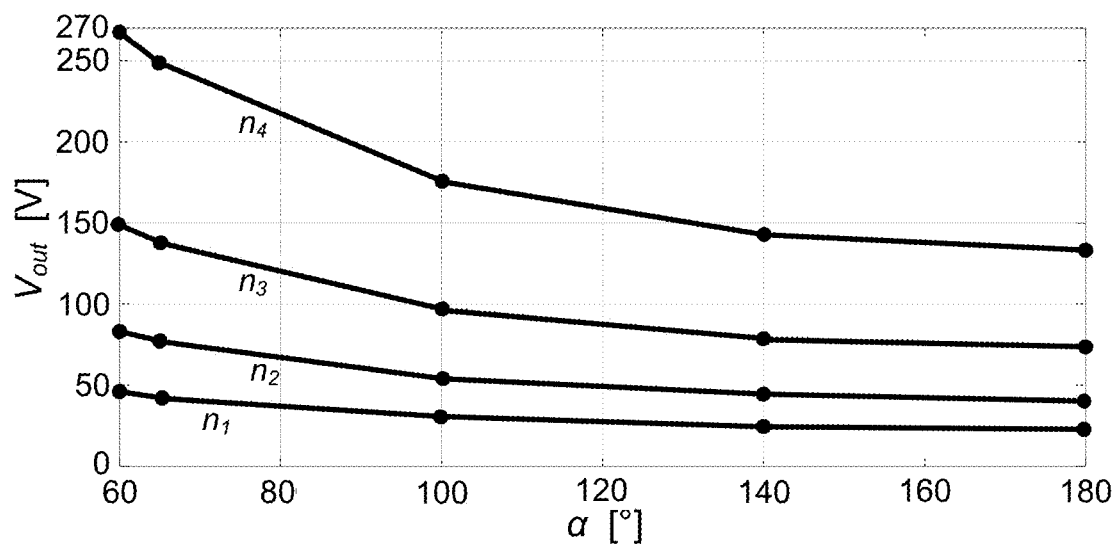
FIG. 10 depicts simulation results output voltage ($V_{out}$) of the PRC of FIG. 9B with varying phase shift angle α, at full power.

Based on the design method discussed above, a converter is designed for operation up to 1 kW with an output voltage range of 24 V-250 V and simulation is performed. The designed converter parameters are tabulated in Table III. Simulation results are shown in FIG. 10 where the bottom plot corresponds to operation in mode 'n$_1$', the next plot is for operation in mode 'n$_2$', the next plot is for operation in mode 'n$_3$' and the top plot is for operation in mode 'n$_4$'. Other simulation results (not shown) demonstrate that the entire range of operation the stress in the resonant tank components are limited, owing to the advantage of operating in different modes using multi winding transformer.

TABLE II

PARAMETERS OF THE CONVERTER

| Parameter | Value |
|---|---|
| L$_r$ (μH) | 423.4 |
| C'$_r$ (nF) | 23.5 |
| f$_s$ (kHz) | 250 |
| n$_P$:n$_1$:n$_2$:n$_3$:n$_4$ | 16:0.56:1:1.8:3.23 |
| I$_g$ (A) | 1 |
| V$_{out}$ (V) | 24-250 |
| P$_{out}$ (W) | 50-1000 |
| L$_{f1}$ (μH) | 10 |
| L$_{f2}$ (μH) | 150 |
| C$_{out}$ (μF) | 2.4 |

Figure 11:
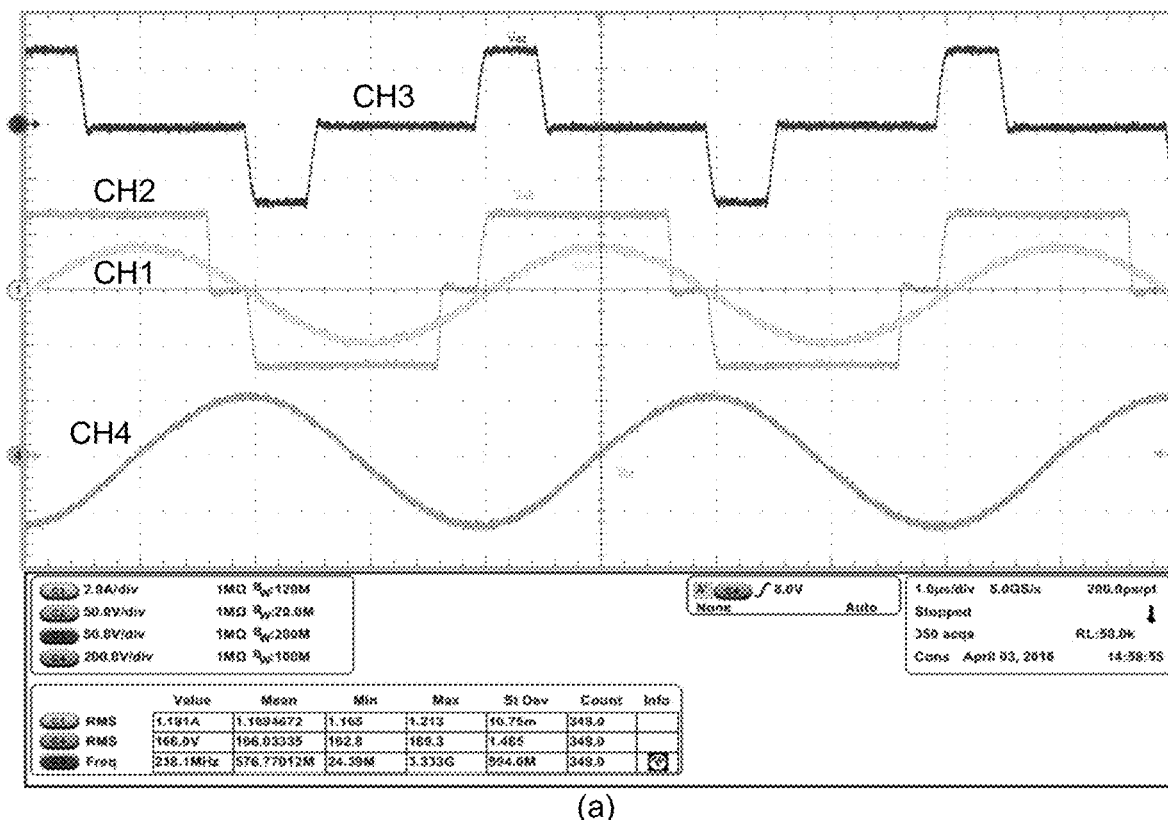
FIG. 11 depicts operating waveforms of a test converter based on the PRC of FIG. 9B for $V_{out}$=80 V at $P_{out}$=50 W (a) and $P_{out}$=500 W (b)
Figure 11:
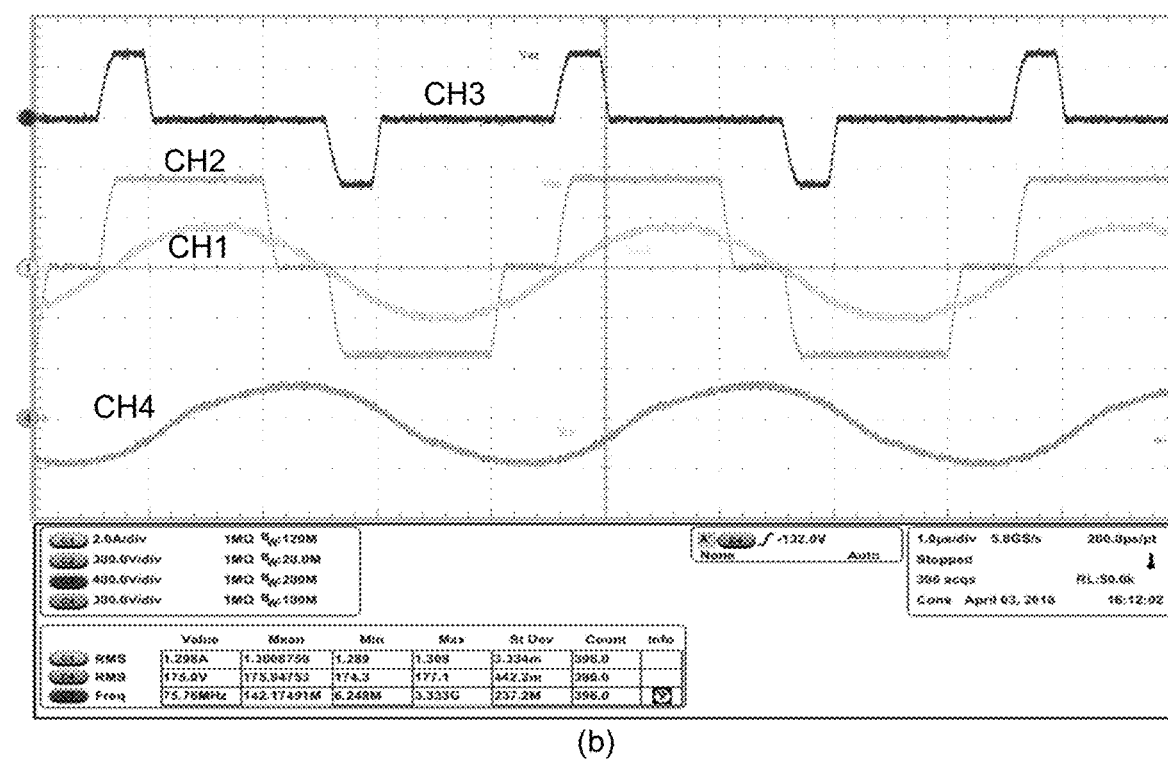
Figure 12:
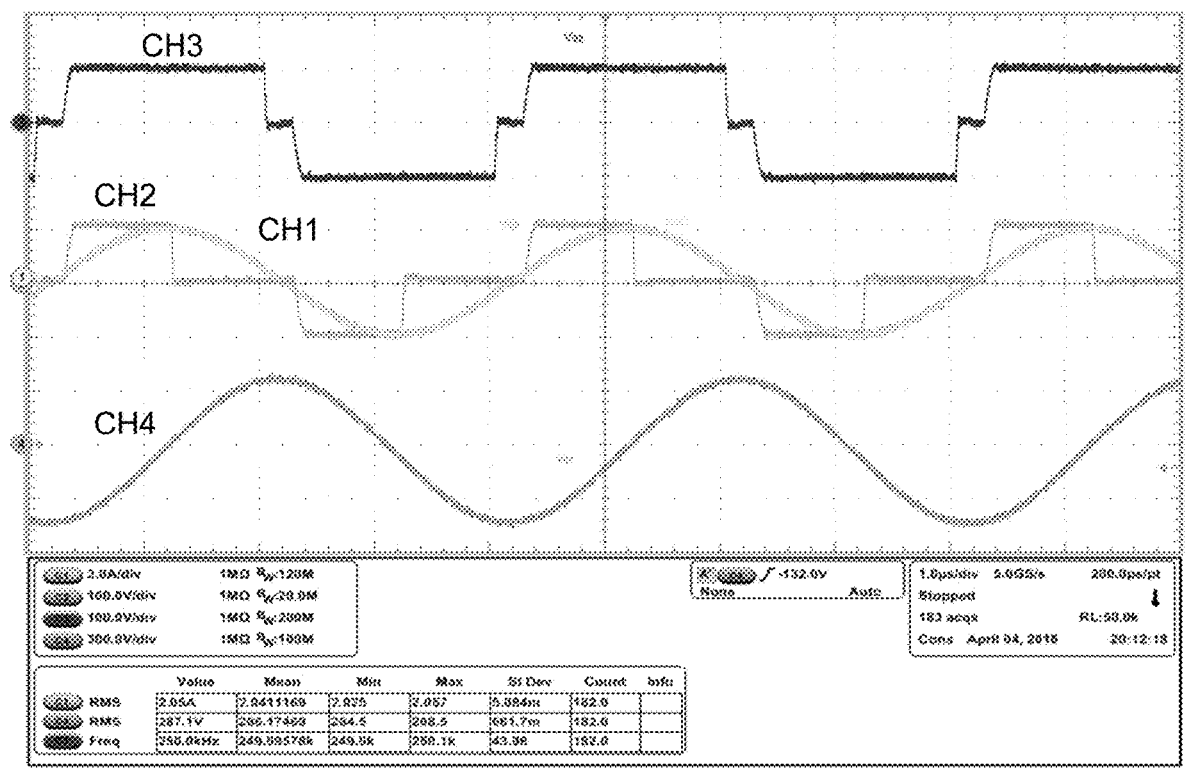
FIG. 12 depicts operating waveforms of the test converter for $V_{out}$=250 V at $P_{out}$=50 W (a) and $P_{out}$=500 W (b)
Figure 12:
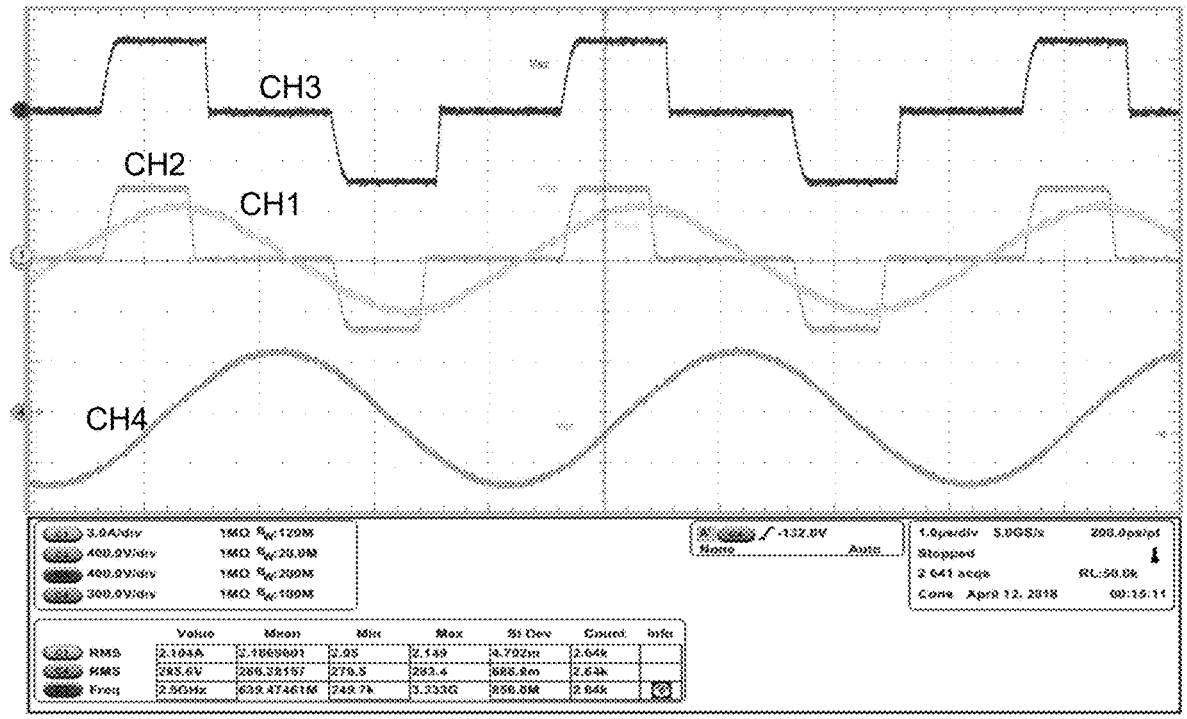

A hardware prototype ("test converter") has been built with two secondary windings on the transformer secondary and one rectifier and filter block to validate the design based on the parameters presented in Table III. With this prototype, the test converter is operated in mode 'n$_4$' and 'n$_3$' with an output voltage range of 80 V to 250 V over a load range of 50 W-500 W. FIGS. 11 and 12 show the steady state operating waveforms for minimum and maximum output voltage of 80 V and 250 V, respectively at two different output power level of 50 W and 500 W. In FIGS. 11 and 12, CH1 is the current in the resonant inductor, CH2 is the inverter output voltage V$_{out}$, CH3 shows the voltage between inverter leading leg (leg A) and ZVS assisting leg (leg Z) and voltage across the resonant capacitor is shown in CH4. From the plots in FIGS. 11 and 12, it can be observed that switches in both the inverter legs and the ZVS assisting leg transitions through ZVS for the entire range of output voltage and load.

Figure 13:
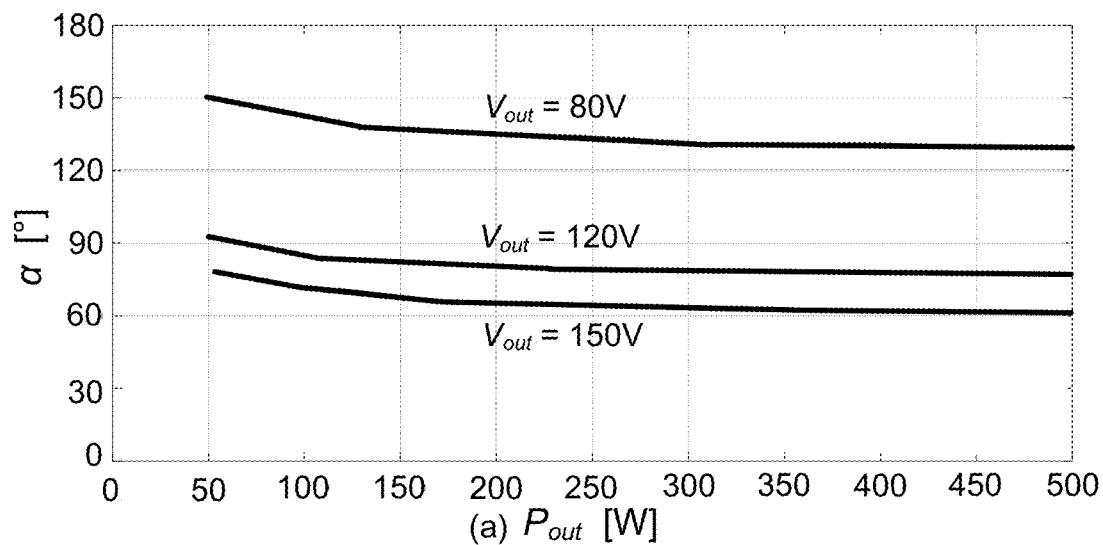
FIG. 13 depicts variation of control angle a over an entire load range for different output voltages in mode 'n3' (a) and mode 'n4' (b)
Figure 13:
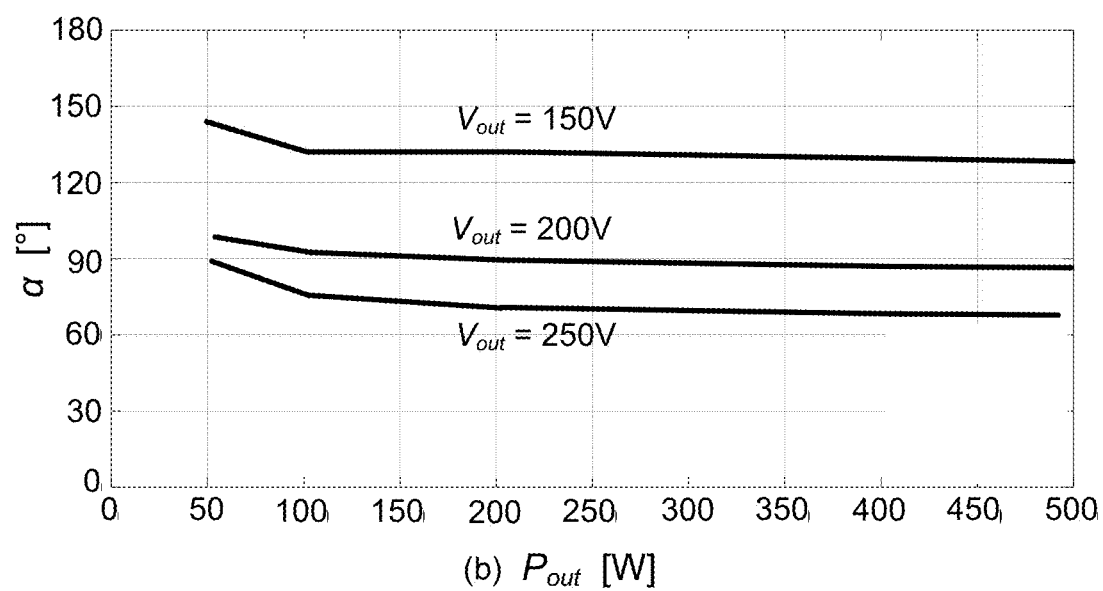
Figure 14:
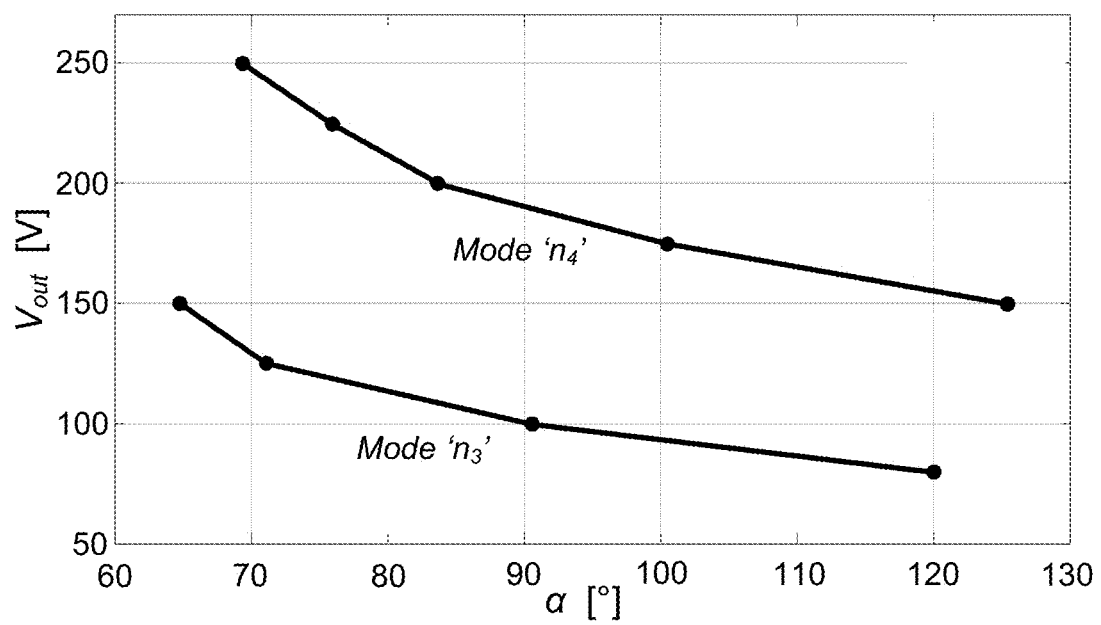
FIG. 14 depicts steady state DC output voltage of the test converter at different control angle α with 500 W load.

FIG. 13 shows the variation of control angle α over the range of load for minimum, maximum and intermediate voltages in both mode 'n$_3$' and 'n$_4$'. It can be noticed that the control angle α stays relatively flat for the load range, at each output voltage. The slightly higher value of required a at light load is accounted for DCM operation of the output rectifier section 206. In FIG. 14 the steady state output voltage of the converter at different control angle α at 500 W load is shown where, the upper plot is for operation in mode 'n$_4$' when the power is processed through winding 'S$_4$' and the lower plot is for operation in mode 'n$_3$' when the power is processed through winding 'S$_3$'. It can be seen from FIG. 14 that output voltage range of 80 V-250 V is obtained with a relatively small variation in α (~60°) which is possible because of utilization of the multi-winding transformer.

Efficiency of the converter (not shown) was plotted against load variation for minimum, maximum and intermediate voltages in both mode '$n_3$' and '$n_4$' with peak efficiency ~94%. The converter operates with similar efficiency profile in both modes despite different voltage outputs in two modes. Within any mode of operation, efficiency at lower output voltage is higher compared to higher output voltage, at same power. This is owing to the fact, that within a mode of operation, at higher output voltage the transformer sees a higher voltage swing and consequently higher flux swing in its magnetic core and thus results in higher core loss, irrespective of output load. With better design of the transformer, the core loss can be minimized and thus higher efficiency can be achieved.

In under-sea DC current distribution systems, designing a converter for regulated output voltage over wide range imposes a significant challenge in minimizing component stress and optimizing efficiency. A converter architecture (PRC 900/901) involving a parallel resonant converter with a multi-winding transformer and switch network is described herein and shows how this converter (PRC 900/901) can operate with relatively low component stress under a wide output voltage and load range for constant current DC distribution systems 100. Simulation results show how the converter operates with limited stress across the converter components under such wide range of operating points of 24 V-250 V output voltage with full load of 1 kW, from a 1 A constant current source. Prototype hardware results demonstrate the operation of the converter in two modes, for 80 V-250 V output range over a load range of 50 W-500 W fed from a 1 A constant current source with 250 kHz switching frequency.

Figure 15:
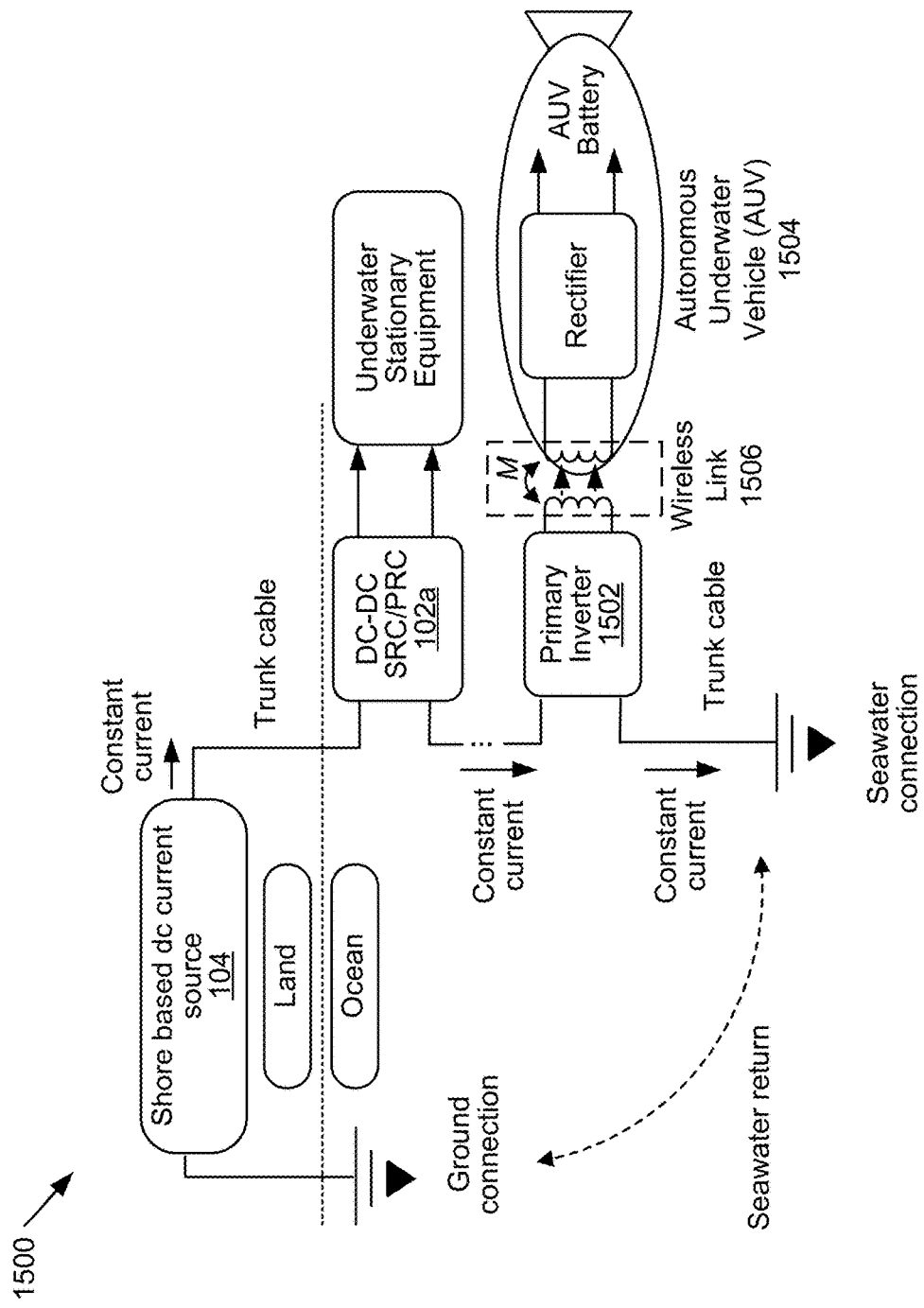
FIG. 15 is a schematic block diagram illustrating one embodiment of a system with an inverter providing power wirelessly to a mobile device.

FIG. 15 is a schematic block diagram illustrating one embodiment of a system 1500 with an inverter providing power wirelessly to a mobile device. The system 1500 includes a shore-based DC current source 104, trunk cable, and series resonant converters or parallel resonant DC-DC converters 102a, which are substantially similar to those described above. The system 1500 also includes a primary inverter 1502 and a mobile device 1504 in the form of an autonomous underwater vehicle ("AUV"), which includes a battery. The system 1500 also includes a wireless link 1506 between the primary inverter 1502 and the mobile device 1504 for wireless power transfer between the primary inverter 1502 and the mobile device 1504. While the mobile device 1504 is shown as an AUV, other mobile devices may be used and the system 1500 is applicable to any primary inverter 1502 fed by a constant current source 104 and any mobile device 1054 where power is transferred wirelessly between the primary inverter 1502 and the mobile device 1504 over a wireless link 1506.

Figure 16:
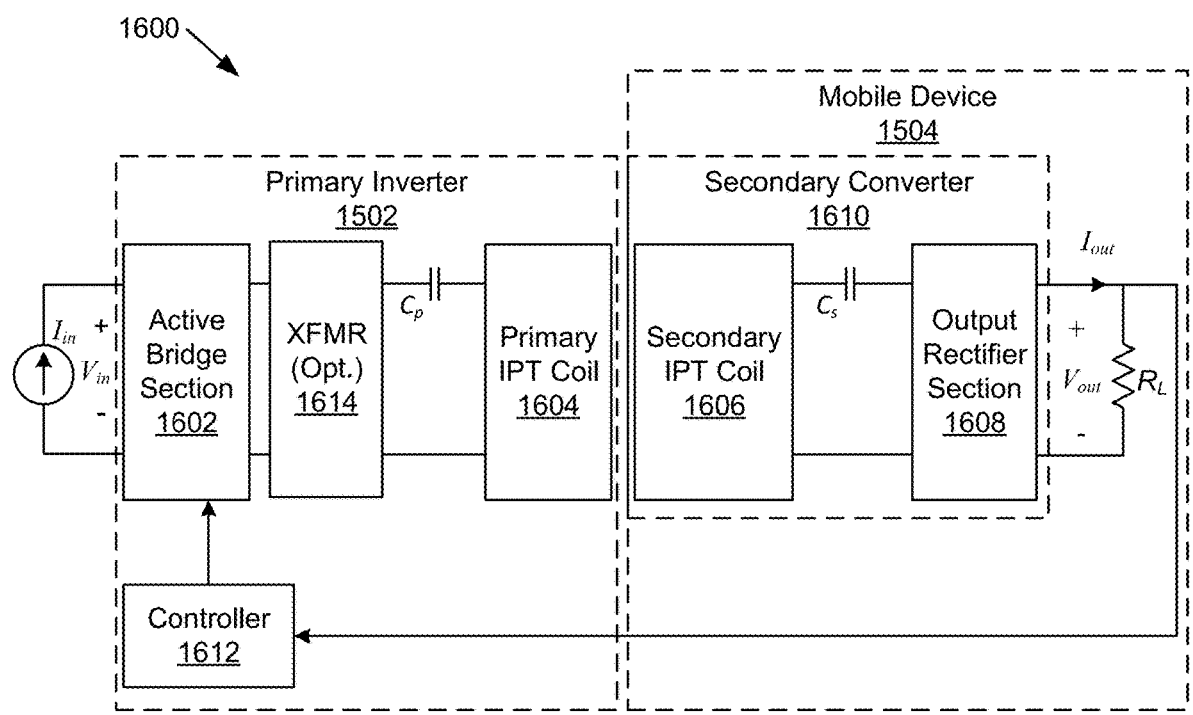
FIG. 16 is a schematic block diagram illustrating a primary inverter and a secondary converter for wireless power transfer.

FIG. 16 is a schematic block diagram illustrating a primary inverter 1502 and a secondary converter 1610 for wireless power transfer. In some embodiments, the primary inverter 1502 includes an active bridge section 1602, a primary resonant capacitor $C_p$, and a primary inductive power transfer ("IPT") coil 1604. In some embodiments, a secondary IPT coil 1606, a secondary resonant capacitor $C_s$, and an output rectifier section 1608 are included in the secondary converter 1610. In various embodiments, the secondary converter 1602 and load $R_L$ part of a mobile device 1504. In other embodiments, a controller 1612 are included in the primary inverter 1502. In other embodiments, the controller 1612 is located elsewhere, such as in the mobile device 1504. In some embodiments, the primary inverter 1502 includes a transformer 1614, which is optional.

In some embodiments, the active bridge section 1602 includes input terminals that receive power from a constant current source $I_{in}$. In some embodiments, the constant current source $I_{in}$ is the trunk cable in the system 1500 of FIG. 15. In some embodiments, the active bridge section 1602 operates at a fixed switching frequency. The active bridge section 1602, in some embodiments, is substantially similar to the active bridge section 202 of the apparatus 200 of FIG. 2. The active bridge section 1602 is describe in more detail below.

In some embodiments, the primary resonant capacitor $C_p$ is connected in series with the active bridge section 1602. In other embodiments, the transformer 1614 is connected between the active bridge section 1602 and the primary resonant capacitor $C_p$. The primary IPT coil 1604 is connected in series with the primary resonant capacitor $C_p$ and power is transferred wirelessly between the primary IPT coil 1604 and the secondary IPT coil 1606.

The secondary IPT coil 1606 is connected in series with the secondary resonant capacitor G, which is connected in series with the output rectifier section 1608. The output rectifier section 1608 is connected to the load $R_L$ through output terminals.

In some embodiments, the controller 1612 regulates output voltage $V_{out}$ to the load $R_L$, where the controller 1612 regulates output voltage $V_{out}$ to the load $R_L$ by controlling switching of the active bridge section 1602. In some embodiments, the controller 1612 regulates output voltage $V_{out}$ to the load $R_L$ using a symmetrical phase shift modulation of a phase shift angle between a first switching leg and a second switching leg of the active bridge section 1602. The first switching leg and the second switching leg, in some embodiments, each operate at a 50 percent duty cycle.

Figure 17A:
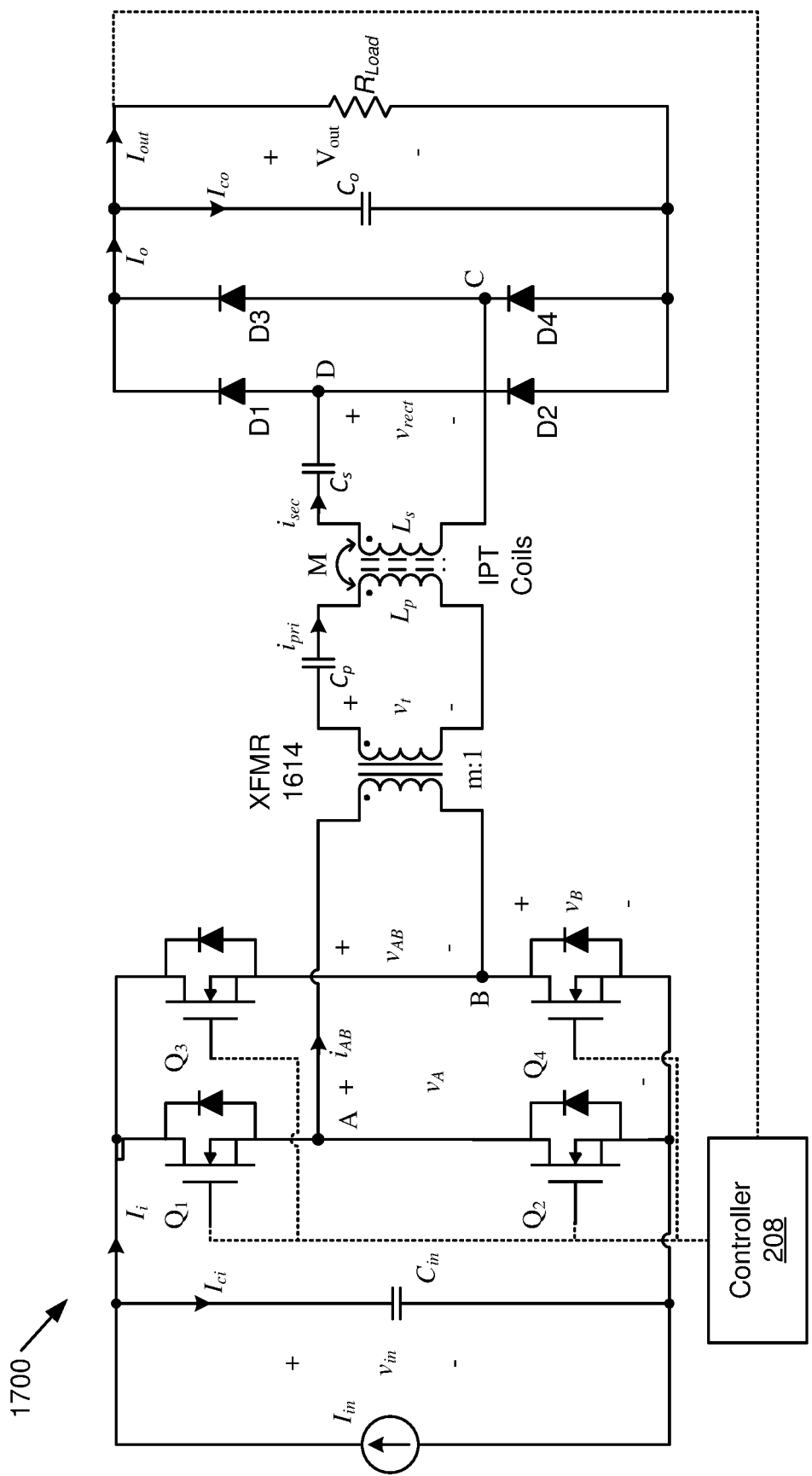
FIG. 17A is a schematic block diagram illustrating more detailed embodiment of the primary inverter and the secondary converter of FIG. 16 where the primary inverter includes a transformer.
Figure 17B:
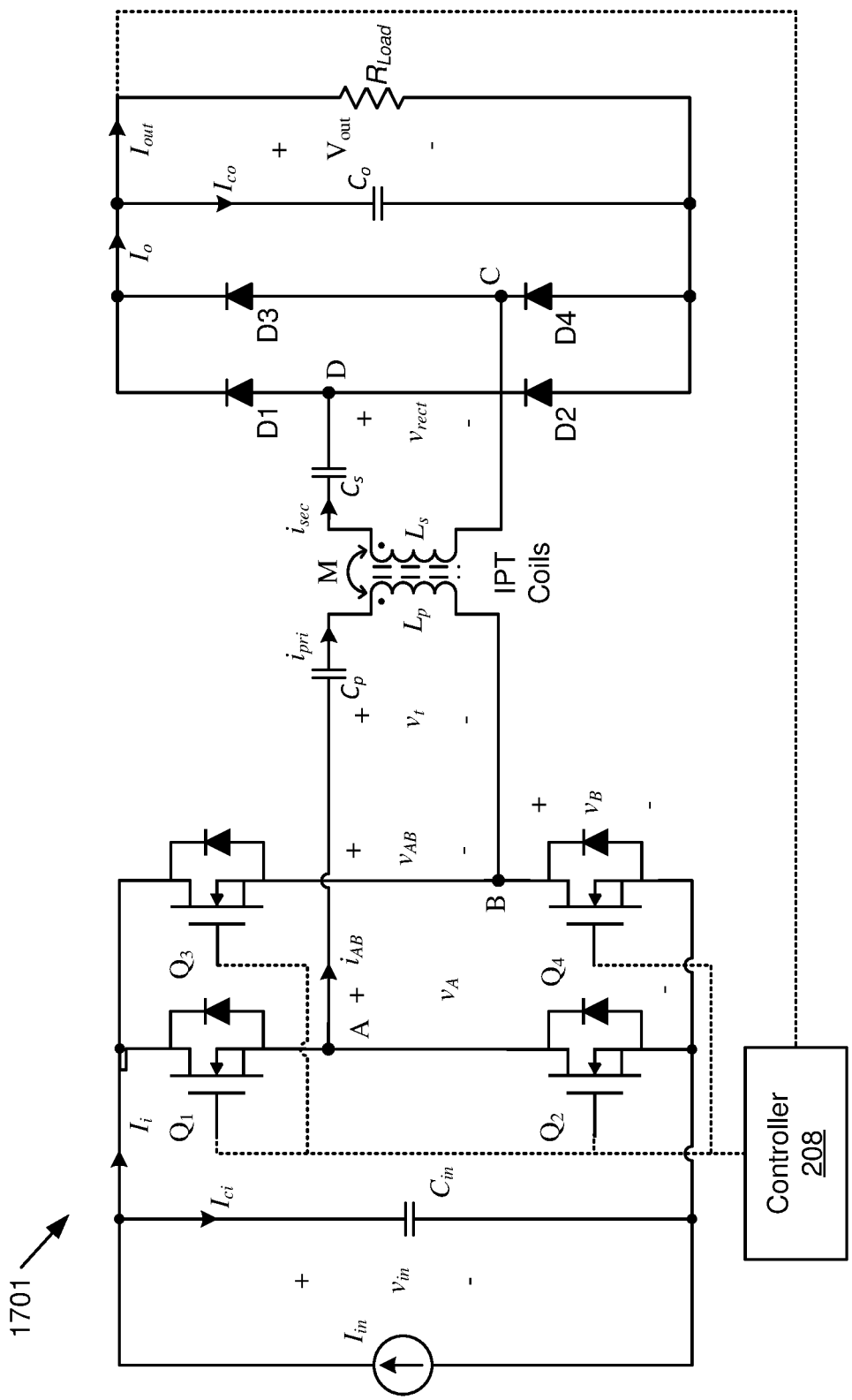
FIG. 17B is a schematic block diagram illustrating more detailed embodiment of the primary inverter and the secondary converter of FIG. 16 where the primary inverter is without a transformer.

FIG. 17A is a schematic block diagram illustrating more detailed embodiment 1700 of the primary inverter 1502 and the secondary converter 1610 of FIG. 16 where the primary inverter 1502 includes a transformer 1614. FIG. 17B is a schematic block diagram illustrating more detailed embodiment 1701 of the primary inverter 1502 and the secondary converter 1610 of FIG. 16 where the primary inverter 1502 is without a transformer 1614. The primary inverter 1502 includes four switches $Q_1$-$Q_4$ in a full-bridge configuration. The switches $Q_1$-$Q_4$ are typically semiconductor switches capable of operation above about 500 hertz ("Hz"). In some embodiments, the primary inverter 1502 includes an input capacitor $C_{in}$, which provides some filtering. The output rectifier section 1608 includes four diodes $D_1$-$D_4$. In other embodiments, the four diodes $D_1$-$D_4$ are replaced by switches. In some embodiments, an output capacitor $C_{out}$ functions as a low pass filter. In other embodiments, the low pass filter includes an inductor (not shown) in series between the $D_1$-$D_4$ and output capacitor $C_{out}$.

The load is depicted as a resistor $R_L$, but may be a battery, a motor, electronics, etc. or any combination thereof. Where the secondary converter 1602 is part of a mobile device 1504, the load is part of the mobile device 1062 and may be a battery (not shown).

The primary IPT coil 1604 is represented by a primary IPT inductor $L_p$ and the secondary IPT coil 1606 is represented by a secondary IPT inductor $L_s$ which are coupled through a gap by a mutual inductance M. Positioning of the secondary IPT coil 1606 with respect to the primary IPT coil 1604, affects a mutual inductance between the coils 1604, 1606, which affects mutual inductance M.

The proposed IPT topology with constant current input and constant voltage output is shown in FIG. 17A, which is obtained by replacing the series resonant tank and transformer of a constant DC current input series resonant converter with a series-series (S-S) compensated IPT network and a current-boost transformer 1614. The switches $Q_1$ through $Q_4$ form the full-bridge inverter (legs A and B), and the diodes $D_1$ through $D_4$ form the full-bridge rectifier (legs D and C). The IPT coils 1604, 1606 are represented by the primary & secondary self-inductances ($L_p$ & $L_s$) and their mutual inductance M. The primary and secondary compensation capacitors are represented as $C_p$ and $C_s$ respectively; which compensate the self-inductances of the corresponding coil fully at the resonant frequency of the primary inverter 1502 and the resonant frequency of the secondary converter 1610. The current-boost transformer 1614 provides a current gain of m with a turns ratio of m:1. The phase angle between the inverter leg gate pulses, denoted as $\varphi_{AB}$, is shown in FIG. 4, determines the conduction interval of the inverter switches $Q_1$-$Q_4$. The important alternating current ("AC") and direct current ("DC") voltage and current quantities are marked in FIG. 17A.

A steady-state analysis of the topology includes an equivalent circuit analysis, derivation of the voltage & current expressions and the operational highlights of the system based on them. The following subsections present the analysis. The fundamental harmonic approximation (FHA) is applied here; which indicates that the power transfer is considered to be through the fundamental harmonic. Also, all circuit losses are neglected from the steady-state analysis since the focus of this section is to describe the operational characteristics of the topology. In the actual system, voltage droop is observed from light load to full load owing to the losses in parasitic series resistances, but with proper design the load regulation can be maintained within 10% for 10% load up to full load, as presented below.

For the equivalent circuit analysis, in some embodiments, the primary inverter 1502 configuration in the proposed topology is the same as in the constant DC current input series resonant converter discussed above. The corresponding steady-state relations can be directly used here. In some embodiments, the current-boost transformer 1614 only performs current-boost or voltage step-down. Hence, for steady-state analysis, in some embodiments, an equivalent circuit representations of the primary inverter 1502 and the transformer 1614 are not required.

Figure 18:
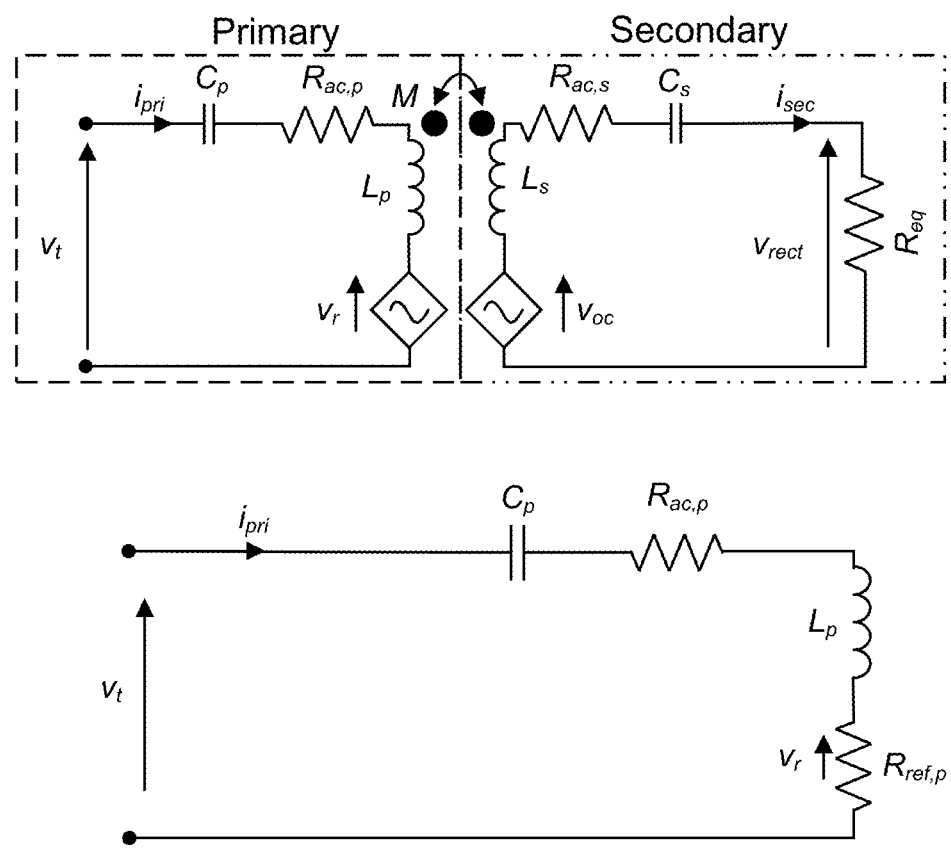
FIG. 18 is a schematic block diagram illustrating one embodiment of an equivalent circuit diagram for the primary inverter and secondary converter of FIG. 17B.

The equivalent circuit of the S-S compensated IPT interface including diode rectifier is shown in FIG. 18. Typically, there are two methods to model the IPT interface: mutual inductance model or loosely coupled transformer model. The mutual inductance model is used herein, which allows, in case of full compensation, to analyze the primary and secondary tanks as two individual series resonant circuits. The two individual series resonant circuits, however, are coupled through the magnetic coupling of the IPT coils 1604, 1606, which brings the mutual coupling induced voltages in the equivalent circuit. In FIG. 18, $v_r$ represents the mutual coupling induced voltage in the primary coil by the secondary coil current and $v_{out}$ represents the mutual coupling induced voltage in the secondary IPT coil 1606 by current in the primary IPT coil 1604.

With the primary coil root-mean-square ("rms") current denoted by $I_{pri}$ and the secondary IPT coil rms current denoted by $I_{sec}$, the rms values of $v_r$ and voc ($V_r$ and $V_{oc}$ respectively) can be expressed from the mutual inductance relationships as:

$$V_r = \omega_s M I_{sec}, \quad (25)$$

$$V_{oc} = \omega_s M I_{pri}. \quad (26)$$

where $\omega_s = 2\pi f_s$ is the angular frequency of the primary coil current ($i_{pri}$) and the secondary coil current ($i_{sec}$) with $f_s$ representing the frequency of the currents. In this topology the primary series resonant tank is directly controlled from the primary inverter 1502, but $I_{sec}$ is load dependent. Hence, an alternate expression of $V_r$ in terms of $I_{pri}$ is more usable, which leads to the primary tank equivalent circuit shown in FIG. 18.

To get the expressions of the reflected impedance ($Z_{ref,p}$), which is the effect of the secondary tank impedance ($Z_{sec}$) on the primary tank, at first the equivalent circuit of the diode rectifier with capacitive DC side filter is considered from FIG. 17A. For the resistive load shown in FIG. 1, an equivalent resistance given by $$R_{eq} = \frac{8}{\pi^2} R_{load}. \quad (27)$$

where $R_{load}$ is the load resistance. Using this equivalent representation, the secondary tank impedance is obtained as:

$$Z_{sec} = R_{eq} + j\left(\omega_s L_s - \frac{1}{\omega_s C_s}\right). \quad (28)$$

Then, the expression of $Z_{ref,p}$ is obtained and the corresponding expression for primary tank impedance ($Z_{pri}$) is obtained as:

$$Z_{ref,p} = \frac{\omega_s^2 M^2}{Z_{sec}}, \quad (29)$$

$$Z_{pri} = Z_{ref,p} + j\left(\omega_s L_p - \frac{1}{\omega_s C_p}\right). \quad (30)$$

Steady-state expressions are developed for the different electrical quantities of the circuit shown in FIG. 17A using the equivalent circuit representations. The relations between the input DC voltage ($V_{in}$) input DC current ($I_{in}$), rms inverter output voltage ($V_{AB}$) and rms inverter output current ($I_{AB}$) are obtained as:

$$V_{AB} = \frac{2\sqrt{2}}{\pi} V_{in} \sin\left(\frac{\varphi_{AB}}{2}\right), \quad (31)$$

$$I_{in} = \frac{2\sqrt{2}\, I_{AB}}{\pi} \sin\left(\frac{\varphi_{AB}}{2}\right)\cos(\varphi_P), \quad (32)$$

where $\varphi_p$ is the fundamental frequency power factor angle of the primary resonant tank, obtained from the expression of $Z_{pri}$ as:

$$\varphi_P = \angle Z_{pri} = \tan^{-1}\left[\frac{\Im(z_{pri})}{\Re(z_{pri})}\right]. \quad (33)$$

Manipulation of equation 29 gives the expression of $I_{AB}$ as:

$$I_{AB} = \frac{\pi I_{in}}{2\sqrt{2}\sin\left(\frac{\varphi_{AB}}{2}\right)\cos(\varphi_P)}. \quad (34)$$

The primary tank input voltage and current are the outputs of the current boost transformer 1614, which under steady-state acts just as a m-times current booster, yielding the rms primary tank input voltage ($V_t$) and rms primary tank current ($I_{pri}$), which is also the primary coil current because of the series compensation) as $$V_t = \frac{V_{AB}}{m} = \frac{2\sqrt{2}}{m\pi}V_{in}\sin\left(\frac{\varphi_{AB}}{2}\right), \quad (35)$$

$$I_{pri} = mI_{AB} = \frac{m\pi I_{in}}{2\sqrt{2}\sin\left(\frac{\varphi_{AB}}{2}\right)\cos(\varphi_p)}. \quad (36)$$

The relation between the currents and voltages of the primary IPT coil $L_p$, and secondary IPT coil $L_s$ are governed by mutual inductance. Using a full-bridge diode rectifier input and output model, the relations between rms values of rectifier input voltage ($V_{rect}$), rms value of rectifier input current ($I_{sec}$), which is also the secondary coil current because of the secondary series compensation), DC output voltage ($V_{out}$) and DC output current ($I_{out}$) are obtained as:

$$V_{rect} = \frac{2\sqrt{2}}{\pi}V_{out}, \quad (37)$$

$$I_{out} = \frac{2\sqrt{2}\,I_{sec}}{\pi}\cos(\varphi_s), \quad (38)$$

where $\varphi_s$ is the secondary tank power factor angle, same as the phase angle of $Z_{sec}$ as:

$$\varphi_s = \sqrt{Z_{sec}} = \tan^{-1}\left[\frac{\mathcal{F}(Z_{sec})}{\mathcal{R}(Z_{sec})}\right]. \quad (39)$$

Manipulating equation (37) and plugging in the necessary current and voltage relations, the expression for $V_{out}$ becomes:

$$V_{out} = \frac{\pi}{2\sqrt{2}}V_{rect}. \quad (40)$$

According to an analysis of generalized IPT compensation networks, the primary and secondary IPT tanks are typically compensated at the same resonant frequency and the circuit is operated at the same frequency. This is also required in order to obtain the constant voltage output characteristics from the topology. Under this condition we have, with $f_o$ denoting the resonant frequency of the tanks:

$$f_0 = f_s = \frac{1}{2\pi\sqrt{L_pC_p}} = \frac{1}{2\pi\sqrt{L_sC_s}}, \quad (41)$$

$$Z_{sec} = R_{eq}, \quad (42)$$

$$Z_{pri} = \frac{\omega_s^2 M^2}{R_{eq}}, \quad (43)$$

$$V_{rect} = V_{oc}, \quad (44)$$

$$\varphi_p \approx \varphi_s \approx 1. \quad (45)$$

Plugging required values into equation (37), the output voltage expression is obtained as:

$$V_{out} = \frac{m\pi^2 \omega_s M I_{in}}{8\sin\left(\frac{\varphi_{AB}}{2}\right)}, \quad (46)$$

The input voltage expression is obtained by using the power balance equation, which holds with no circuit losses considered. The power balance equation with the resistive load can be written as:

$$V_{in}I_{in} = \frac{V_{out}^2}{R_{load}}, \quad (47)$$

where plugging in the expression of $V_{out}$ from equation (46), the expression for Vin becomes:

$$V_{in} = \frac{m^2\pi^2\omega_s^2 M^2 I_{in}}{64R_{load}\sin^2\left(\frac{\varphi_{AB}}{2}\right)}. \quad (48)$$

From the equivalent circuit analysis and the steady-state equations governing the operation of the topology, the several characteristics can be inferred. The output voltage equation in (46) indicate that the output voltage is load independent; which proves the constant voltage output ("CVO") characteristics of the topology. Essentially the system operates similarly to a constant primary current S-S topology, but with a constant DC current input, a voltage-fed primary tank and the primary current controlled through the inverter phase angle, as per equation (36). Equation (46) also indicates that the output voltage is controllable through the inverter phase angle $\varphi_{AB}$. The presence of the term sin ($\varphi AB/2$) in the denominator of equation (46) indicates that a higher output voltage is obtained at lower values of $\varphi_{AB}$, with $\varphi_{AB}$ in the range 0° to 180°.

The topology of FIGS. 17A and 17B, even though being a voltage-fed S-S type, can be reliably operated at no-load conditions. As equation (36) indicates, the primary tank current is only dependent on the input current and the inverter phase angle, and does not depend on the reflected impedance, which goes to zero under no-load condition. The inverter phase angle can be adjusted to 180° to keep the primary tank current and hence losses associated with the primary tank to a minimum under such operation. This is in direct contrast to the traditional constant DC voltage input S-S IPT topologies where the primary current can be significantly high under no-load condition.

Equation (37) shows that, with the system fed from constant current input and operating as a constant voltage output, $V_{in}$ is load dependent. $V_{in}$ attains higher values for any operating point resulting in higher power output, and is minimum for no-load operation with $\varphi_{AB}$=180°.

The steady-state analysis presented above is typically valid as long as operation is at the resonant frequency and fundamental harmonic approximation is applicable. However, owing to the presence of the diode rectifier and the low operating quality factors of the primary tank, essentially similar to DC current input series resonant converter, fundamental harmonic approximation ("FHA") is not applicable for all load ranges. In the presented system the tank quality factors and their inter-dependence dictates operable load range where FHA can be applied and current harmonic related adversities can be avoided. Hence the tank quality factors and their relation with the circuit operation are important considerations for the design of the topology.

Tank loaded quality factors are defined as the ratio of the tank reactive power to the active power delivered to the load at the frequency of operation. In this system they are defined at the fundamental frequency, as most of the power gets transferred at the fundamental frequency. Both the tanks are voltage-fed series resonant tanks, where the definition of quality factor leads to the ratio of the inductive reactance and the equivalent load resistance seen by the tank.

Hence, the secondary tank loaded quality factor ($Q_{s,load}$) is directly obtained from the equivalent circuit in FIG. 18, with the equivalent load resistance of $R_{eq}$, as:

$$Q_{s,load} = \frac{\omega_s L_s}{R_{eq}}. \tag{49}$$

For the primary tank, the equivalent circuit of FIG. 18 is used with the consideration that operation is considered at the resonant frequency. Under this condition with the fully compensated secondary tank, $Z_{sec}$ is equivalent to $R_{eq}$. Hence, the reflected primary impedance $Z_{ref,p}$ equals its real part, defined here as reflected load resistance ($R_{ref,p}$). Its expression, and the corresponding value of primary tank loaded quality factor are then obtained as:

$$R_{ref,p} = \frac{\omega_s^2 M^2}{R_{eq}}, \tag{50}$$

$$Q_{p,load} = \frac{\omega_s L_p}{R_{ref,p}}. \tag{51}$$

Manipulation of equation (51) by plugging in the expression of $R_{ref,p}$ from equation (50) and using the relation between M, $L_p$ and $L_s$ in terms of the coupling factor (k):

$$M = k\sqrt{L_p L_s}, \tag{52}$$

the expression of $Q_{p,load}$ becomes:

$$Q_{p,load} = \frac{\omega_s L_p R_{eq}}{\omega_s^2 M^2} = \frac{R_{eq}}{k^2 \omega_s L_s}, \tag{53}$$

where using the relation in equation (49), expression of $Q_{p,load}$ becomes:

$$Q_{p,load} = \frac{1}{k^2 Q_{s,load}}. \tag{54}$$

Equation (54) shows that the quality factors of the two tanks are inversely proportional to each other, with the constant of proportionality being the inverse square of the coupling factor k. It can also be identified that the secondary tank operates at lower quality factor at light load whereas the primary tank quality factor degrades at higher load.

Low quality factor in a series resonant tank leads to higher current harmonics. The presence of harmonic currents increases the tank rms current for the same output power, produces additional electromagnetic interference (EMI) owing to the harmonic frequency magnetic fields and distorts the current waveform leading to modification of soft switching conditions. For the secondary resonant tank, below $Q_{s,Load}$=1.57, the diode rectifier goes into discontinuous conduction mode (DCM), leading to further harmonic distortion. Under this condition the diode rectifier cannot be modeled as discussed above, and alternate time-domain modeling is required for steady-state analysis. For underwater IPT systems, the coils operate in saline water, where the eddy current losses increase exponentially with increase in frequency of coil currents. Hence presence of the harmonic currents further degrade the system efficiency for such systems.

In this regard, controlling the inverter phase angle $\varphi_{AB}$ in the range 110° to 140° reduces harmonic voltage injection in the system, with $\varphi_{AB}$=120° snubbing the third harmonic voltage. Hence $\varphi_{AB}$=120° is considered for design. This condition may not result in generation of the desired output voltage, since the required current through the primary IPT coil $L_p$, obtained in terms of the output voltage by manipulation of equations (26), (37) and (44) as:

$$I_{pri} = \frac{V_{out}}{2\sqrt{2}\,\omega_s M} \tag{55}$$

may not be produced at $\varphi_{AB}$=120°. Hence the current-boost transformer 1614 is introduced in the system. The transformer 1614, in some embodiments, can only be avoided if the primary coil is designed with high turns and inductance, which is difficult for space constrained AUV applications. The transformer 1614 also gives flexibility to use smaller turn coils for the IPT and provide necessary current gain through the transformer 1614, and its unavoidable leakage inductance improves primary tank quality factor. The turns ratio m of the transformer is decided based on the output voltage equation (46), which automatically sets the required primary coil current as equation (55).

To improve the primary tank full load quality factor, the IPT coil design is optimized. Usually IPT systems are designed to maximize k, whereas maximizing k can end up in additional degradation of the full-load value of $Q_{p,Load}$ in this topology. Hence the condition in equation (54) can be considered as an important magnetics optimization constraint for the design of this topology for desired output specifications.

The analysis presented above was used to design a 16V, 330W system using two existing coils, whose parameters are $L_p$=7.25 microhenries ("µH"), $L_s$=2.91 µH, $C_p$=36.8 nanofarads ("nF"), $C_s$=136 nF. A seawater gap of 18 mm is considered between the coils, which result in a coupling factor k=0.317 from ANSYS® Maxwell simulations. The corresponding mutual inductance between the coils M is obtained as 1.43 µH. Per system requirements, a switching frequency of 250 kHz was evaluated. Operation was evaluated at $\varphi_{AB}$=120°. To obtain $V_{out}$=16 volts ("V"), the transformer turns ratio (m:1) is calculated as 5:1.

Figure 19:
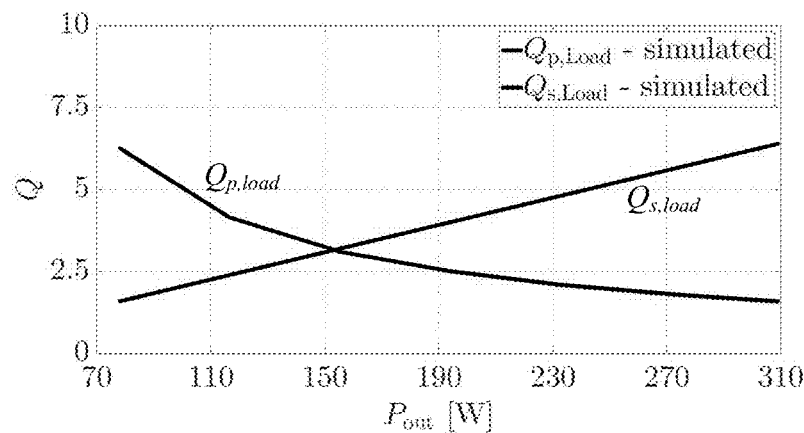
FIG. 19 depicts simulated plots of tank quality factors and current total harmonic distortions versus output power in the range 75 watts ("W") to 310 W.
Figure 19:
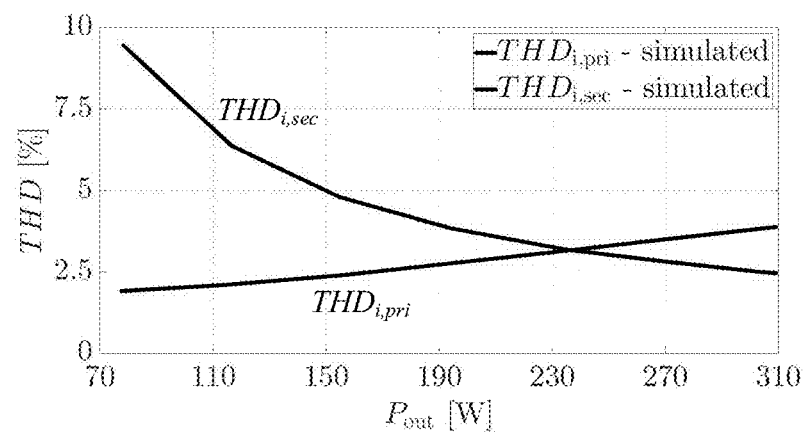

Variation of the tank quality factors with these design choices are shown in FIG. 19(*a*), which demonstrates their inverse relationship. The corresponding tank current harmonic distortions are shown in FIG. 19(*b*), which shows the design choices listed above help in keeping the harmonics low. For $P_{out}$=75 watts ("W"), $Q_{s,load}$ goes below 1.57, driving the diode rectifier to DCM. Hence higher THD of $i_{sec}$ is observed at those operating points and higher output voltages are expected. The coils, wound with an equivalent to American Wire Gauge ("AWG") number 10 Litz wire, are satisfactorily operable up to 23 amperes ("A"). Correspondingly the highest power of operation was limited to 330 W which corresponds to rms secondary tank current of 21 A.

The compensation capacitors are determined at the resonant frequency of operation, and for the primary tank, the leakage inductance ($L_{ls,tr}$) of the transformer is also considered in the design of compensation capacitor. Also, the rms current values of primary and secondary tanks are used to find the voltage rating of the compensation capacitors. The relevant design equations are:

$$C_p = \frac{1}{\omega_s(L_p + L_{ls,tr})}, \quad (56)$$

$$V_{cp} = \frac{I_{pri}}{\omega_s C_p}, \quad (57)$$

$$C_s = \frac{1}{\omega_s^2 L_s}, \quad (58)$$

$$V_{cs} = \frac{I_{sec}}{\omega_s C_s}. \quad (59)$$

With the available coils in the laboratory, and the compensation capacitors and transformers designed as per the equations above, an experimental setup was built.

The compensation capacitor values, as designed by equations (56) and (58), are $C_p$=36.8 nF, $C_s$=136 nF. High voltage low current silicon carbide switches (Part number: C2M1000170D, Ratings: 1700V, 4.9 A) were used for the inverter, whereas low voltage high current Schottky diodes (Part number: APT30S20B S(G) D, Ratings: 200V, 45 A) were used for the rectifier. High voltage Celem power capacitors were used on the primary side and printed circuit board ("PCB") mount capacitors with 500V AC rated capacitors were used for the secondary tank. To alleviate hard-switching due to the inverter phase shift modulation, the zero voltage switching assistance circuit was used. The 5:1 transformer was built with 50-turn primary and 10-turn secondary windings on a TDK® magnetic core. The experiments were carried out in the output power range of 34 W to 330 W, to validate the operation in DCM for lower output powers and the operation at the maximum power point of the setup. A constant DC current input of 1 A and switching frequency of 250 kHz were used, with the tanks tuned to the switching frequency.

Figure 20:
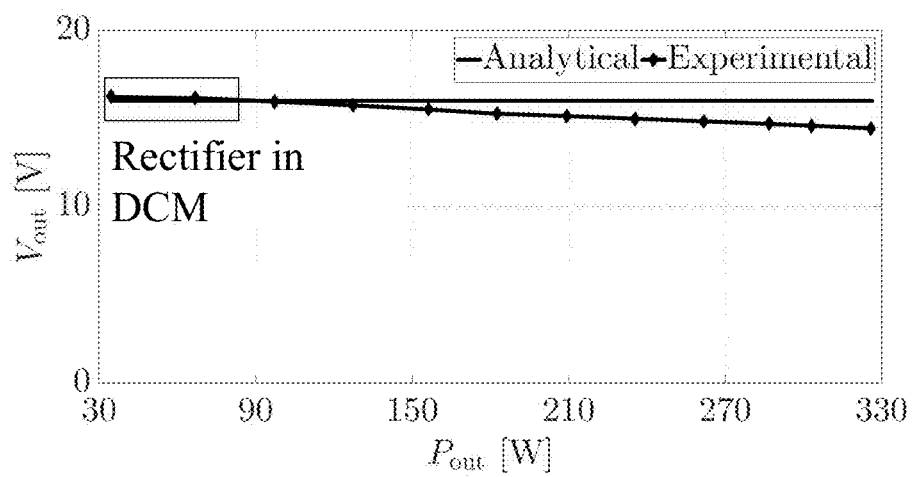
FIG. 20 depicts analytical and experimental plots of output voltage and phase shift versus output power in the range 34 W to 330 W.
Figure 20:
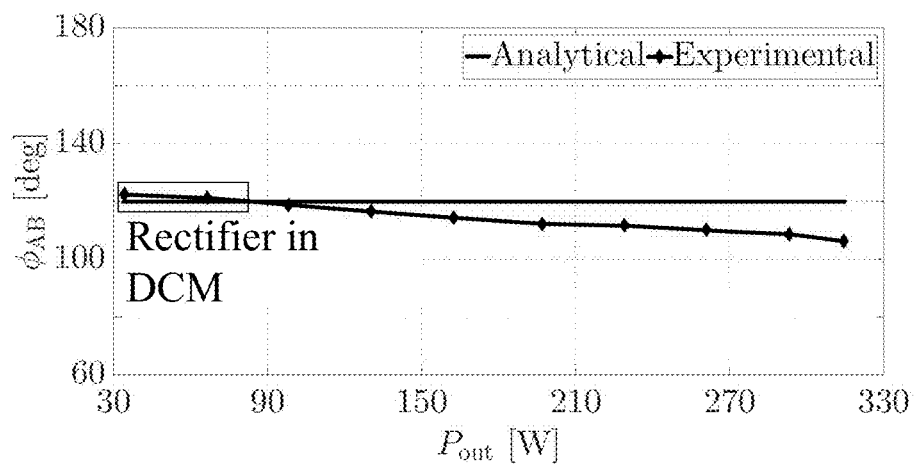

The plots of analytical and experimental dc output voltages ($V_{out}$) over the full output power range are shown in FIG. 20(*a*), with $\varphi_{AB}$=120°. It can be seen that the voltage droop over the power range of 10% to full load is about 1.2V, which shows load regulation is within 10% from the lossless analysis. This demonstrates the constant voltage characteristics. On the other hand, the analytical and experimental values of inverter phase shift ($\varphi_{AB}$) to keep output voltage at 16V are shown in FIG. 20(*b*). It can be seen that, in the power range 75 W to 330 W, a variation in $\varphi_{AB}$ of 15° is sufficient to keep the output voltage at the desired value of 16V. However, below $P_{out}$=75 W, higher $\varphi_{AB}$ values are required to keep $V_{out}$ at 16V. Also, in the same range, the obtained $V_{out}$ for $\varphi_{AB}$=120° are higher than analytical, as can be seen from FIG. 20(*a*). This is due to the diode rectifier operating in DCM, where $V_{out}$ higher than the predictions of the steady-state analysis above is observed, and subsequently higher $\varphi_{AB}$ is required to keep output at a desired voltage.

Figure 21:
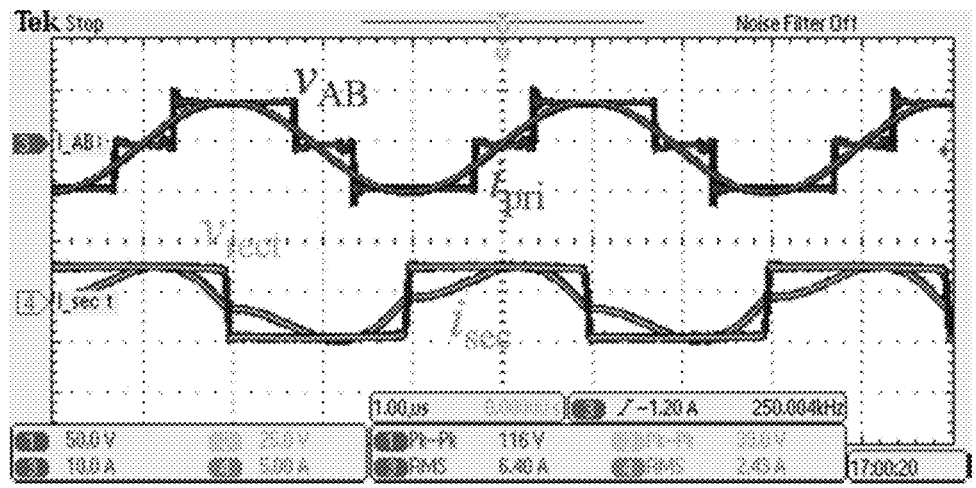
FIG. 21 depicts experimental waveforms of $v_{AB}$, $v_{rect}$, $i_{pri}$ and $i_{sec}$ for an output voltage of 16 volts.
Figure 21:
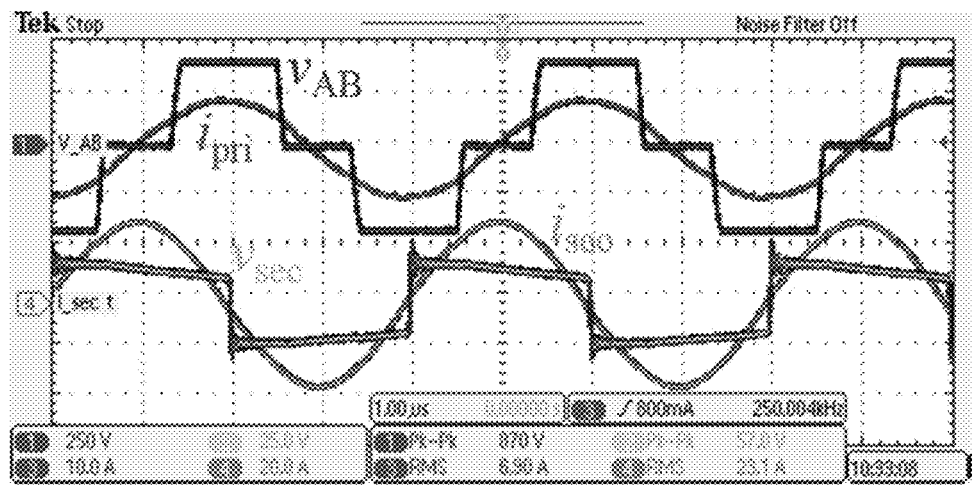

The waveforms of important ac quantities such as the inverter output voltage ($v_{AB}$), rectifier input voltage ($v_{rect}$), primary tank current ($i_{pri}$) and secondary tank current ($i_{sec}$) are shown in FIG. 21(*a*) and FIG. 21(*b*) for $P_{out}$=34 W and $P_{out}$=330 W sec, cases respectively. For both experiments $\varphi_{AB}$ is controlled to keep $V_{out}$=16V. The waveform of $i_{sec}$ in FIG. 21(*a*) demonstrates the DCM operation of the rectifier at Pout=34 W. The change in input voltage from $P_{out}$ of 34 W to 330W is observable from the amplitude of the waveforms of $v_{AB}$, whereas the constant output voltage of 16V is visible from the amplitude of the rectifier input voltage. The rms current readings of $i_{pri}$ shows that the primary current remains fairly constant during the whole power range.

Figure 22:
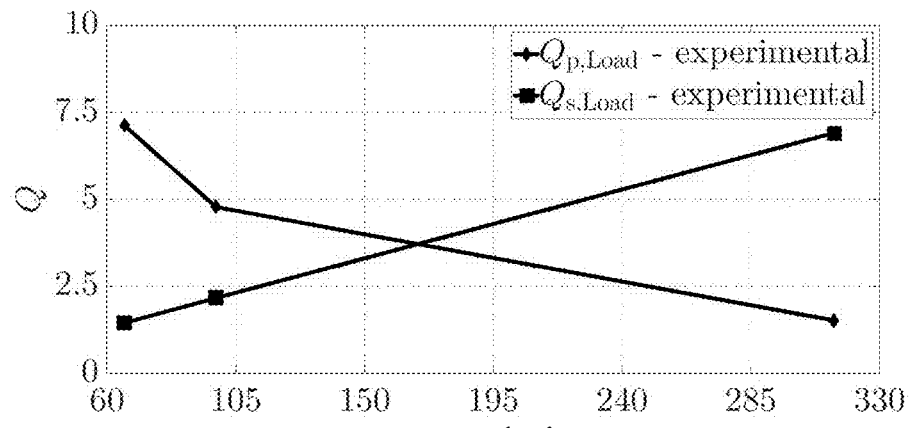
FIG. 22 depicts experimental plots of tank quality factors and current total harmonic distortions versus output power in the range 66 W to 330 W.
Figure 22:
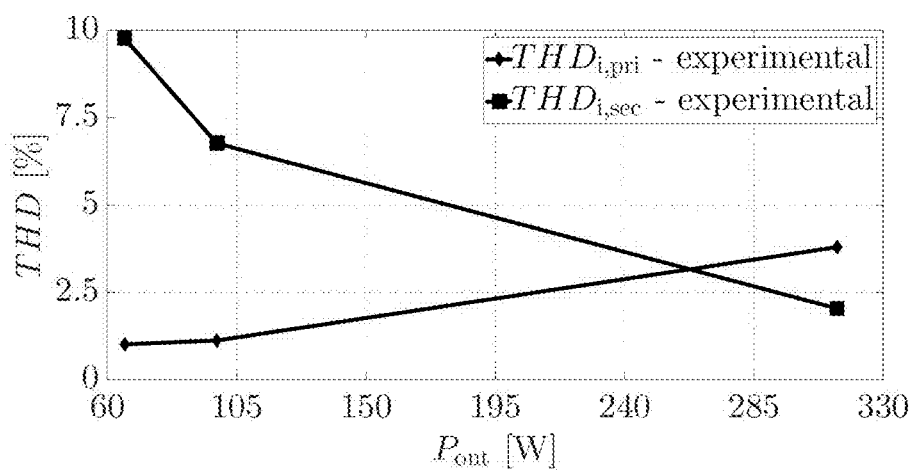

The waveforms of $i_{pri}$ and $i_{sec}$ also show that, $i_{sec}$ has higher distortions at lower $P_{out}$, whereas at higher $P_{out}$, $i_{pri}$ has higher distortion. The corresponding values of the tank quality factors and total harmonic distortion obtained from Fourier analysis of the tanks are shown in FIG. 22(*a*) and FIG. 22(*b*) respectively, which validate the simulated response used for design of the system. Hence the experimental results validate the analysis and design of the proposed current input IPT topology.

At the operating point of $P_{out}$=330 W with $V_{out}$=16V, the total system loss from DC input to DC output was found to be approximately 93 W, which corresponds to a power transfer efficiency of 75%. The losses were occurring in the coil, transformer and capacitor series resistances, on-state resistances of the inverter switches and forward voltage drops of the rectifier diodes. The diode rectifier used in the experiments was designed for a 1 kW, 20 A output system and used up to 330 W while operating at similar DC output currents. With the coils optimized further, the system is expected to be operating up to 1 kW with similar total losses, resulting in achieving higher than 90% efficiency with the same circuit topology.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an active bridge section with input terminals that receive power from a constant current source, wherein the active bridge section operates at a fixed switching frequency;
   a primary resonant capacitor connected in series with an output terminal of the active bridge section;
   a primary inductive power transfer ("IPT") coil connected in series with the primary resonant capacitor, wherein power is transferred wirelessly across a gap between the primary IPT coil and a secondary IPT coil, and the secondary IPT coil is connected in series with a secondary resonant capacitor, which is connected in series with an output rectifier section that receives power from the secondary IPT coil and comprising output terminals for connection to a load; and a controller that regulates output voltage to the load, wherein the controller regulates output voltage to the load by controlling switching of the active bridge section to modulate phase shift of the active bridge section while maintaining the switching frequency of the active bridge section at the fixed switching frequency.

2. The apparatus of claim 1, wherein the controller regulates output voltage to the load and modulates the phase shift of the active bridge section using a symmetrical phase shift modulation of a phase shift angle between a first switching leg and a second switching leg of the active bridge section, wherein the first switching leg and the second switching leg each operate at a 50 percent duty cycle.

3. The apparatus of claim 2, wherein the controller regulates output voltage according to:

$$V_{out} = \frac{\pi^2 \omega_s M I_{in}}{8\sin\left(\frac{\varphi_{AB}}{2}\right)}$$

wherein:
$V_{out}$ is output voltage;
$I_{in}$ in is input current;
M is mutual inductance between the primary IPT coil and the secondary IPT coil; and
$\varphi_{AB}$ is the active bridge section phase shift angle.

4. The apparatus of claim 3, further comprising a transformer, with a turns ratio m, between the active bridge section and the primary resonant capacitor, wherein the controller regulates the output voltage according to:

$$V_{out} = \frac{m\pi^2 \omega_s M I_{in}}{8\sin\left(\frac{\varphi_{AB}}{2}\right)}.$$

5. The apparatus of claim 1, wherein the active bridge section comprises a full active bridge and the output rectifier section comprises a full-bridge rectifier.

6. The apparatus of claim 1, wherein the fixed switching frequency of the active bridge section is equal to a primary resonant frequency of the primary resonant capacitor and an inductance of the primary IPT coil.

7. The apparatus of claim 6, wherein a secondary resonant frequency of the secondary resonant capacitor and an inductance of the secondary IPT coil matches the primary resonant frequency.

8. The apparatus of claim 1, wherein the output rectifier section comprises active switches.

9. The apparatus of claim 8, wherein the load comprises a constant voltage source and in response to power flowing from the secondary IPT coil to the primary IPT coil, the controller adjusts switching of the switches in the output rectifier section to control power transferred to the constant current source by controlling voltage across the constant current source by adjusting a phase shift between a first switching leg and a second switching leg of the output rectifier section while the active bridge section operates at a constant phase shift.

10. The apparatus of claim 1, wherein the output rectifier section is configured as a full bridge rectifier.

11. The apparatus of claim 1, wherein the controller comprises series-series compensation.

12. An apparatus comprising:
a secondary inductive power transfer ("IPT") coil on a mobile device, the secondary IPT coil receives power wirelessly from a primary IPT coil of a primary inverter in a fixed location across a gap between the primary IPT coil and the secondary IPT coil;
a secondary resonant capacitor connected in series with the secondary IPT coil, the secondary resonant capacitor on the mobile device;
an output rectifier section connected in series with the secondary resonant capacitor, wherein an output of the output rectifier section provides power to a load through output terminals, the output rectifier section on the mobile device,
wherein the primary IPT coil is connected in series with a primary resonant capacitor, which is connected in series with an active bridge section, the active bridge section is connected to a constant current source, wherein the primary resonant capacitor and the active bridge section are at the fixed location,
wherein a controller regulates output voltage to the load by controlling switching of the active bridge section to modulate phase shift of the active bridge section while maintaining the switching frequency of the active bridge section at a fixed switching frequency.

13. The apparatus of claim 12, wherein the controller regulates output voltage to the load and modulates the phase shift of the active bridge section using a symmetrical phase shift modulation of a phase shift angle between a first switching leg and a second switching leg of the active bridge section, wherein the first switching leg and the second switching leg each operate at a 50 percent duty cycle.

14. The apparatus of claim 12, further comprising a transformer between the active bridge section and the primary resonant capacitor, wherein the controller regulates output voltage according to:

$$V_{out} = \frac{m\pi^2 \omega_s M I_{in}}{8\sin\left(\frac{\varphi_{AB}}{2}\right)}$$

wherein:
m is a turns ratio of the transformer;
$V_{out}$ is output voltage;
$L_{in}$ is input current;
M is mutual inductance between the primary IPT coil and the secondary IPT coil; and
$\varphi_{AB}$ is the active bridge section phase shift angle.

15. The apparatus of claim 12, wherein the active bridge section comprises a full active bridge and the output rectifier section comprises a full-bridge rectifier.

16. The apparatus of claim 12, wherein a primary resonant frequency of the primary resonant capacitor and an inductance of the primary IPT coil matches a secondary resonant frequency of the secondary resonant capacitor and an inductance of the secondary IPT coil, and wherein the primary resonant frequency and the secondary resonant frequency matches the fixed switching frequency of the active bridge section.

17. The apparatus of claim 12, wherein the output rectifier section comprises active switches and the load comprises a constant voltage source and in response to power flowing from the secondary IPT coil to the primary IPT coil, the controller adjusts switching of the switches in the output rectifier section to control power transferred to the constant current source by controlling voltage across the constant current source by adjusting a phase shift between a first switching leg and a second switching leg of the output rectifier section while the active bridge section operates at a constant phase shift.

18. A system comprising:
- a primary inverter comprising:
  - an active bridge section with input terminals that receive power from a constant current source, wherein the active bridge section operates at a fixed switching frequency;
  - a primary resonant capacitor connected in series with an output terminal of the active bridge section; and
  - a primary inductive power transfer ("IPT") coil connected in series with the primary resonant capacitor;
- a mobile device comprising:
  - a secondary IPT coil;
  - a secondary resonant capacitor connected in series with the secondary IPT coil; and
  - an output rectifier section connected in series with the secondary resonant capacitor, wherein an output of the output rectifier section provides power to a load through output terminals, wherein power is transferred wirelessly across a gap between the primary IPT coil and the secondary IPT coil; and
- a controller that regulates output voltage to the load, wherein the controller regulates output voltage to the load by controlling switching of the active bridge section to modulate phase shift of the active bridge section while maintaining the switching frequency of the active bridge section at the fixed switching frequency.

19. The system of claim 18, wherein the controller regulates output voltage to the load and modulates the phase shift of the active bridge section using a symmetrical phase shift modulation of a phase shift angle between a first switching leg and a second switching leg of the active bridge section, wherein the first switching leg and the second switching leg each operate at a 50 percent duty cycle.

* * * * *